US012628000B2

(12) United States Patent
Zhou et al.

(10) Patent No.: US 12,628,000 B2
(45) Date of Patent: May 12, 2026

(54) BEAM CONFIGURATION REPORTING FOR HIERARCHICAL BEAM PAIR IDENTIFICATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1034 days.

(21) Appl. No.: 17/661,537

(22) Filed: Apr. 29, 2022

(65) Prior Publication Data

US 2023/0354056 A1 Nov. 2, 2023

(51) Int. Cl.
| | |
|---|---|
| *H04W 16/28* | (2009.01) |
| *H04B 17/336* | (2015.01) |
| *H04L 5/00* | (2006.01) |
| *H04W 24/10* | (2009.01) |
| *H04W 56/00* | (2009.01) |

(52) U.S. Cl.
CPC .......... *H04W 16/28* (2013.01); *H04B 17/336* (2015.01); *H04L 5/0051* (2013.01); *H04W 24/10* (2013.01); *H04W 56/001* (2013.01)

(58) Field of Classification Search
CPC .... H04B 17/336; H04L 5/0051; H04W 16/28; H04W 24/10; H04W 56/001
See application file for complete search history.

(56) References Cited

U.S. PATENT DOCUMENTS

| | | | | |
|---|---|---|---|---|
| 12,438,680 B2 * | 10/2025 | Fakoorian | ............. | H04L 5/0073 |
| 2021/0067978 A1 * | 3/2021 | Cheraghi | ............. | H04B 17/336 |
| 2022/0116129 A1 * | 4/2022 | Ying | .................... | H04B 7/0617 |
| 2023/0119660 A1 * | 4/2023 | Athley | .................. | H04W 72/12 |
| | | | | 370/329 |
| 2023/0171810 A1 * | 6/2023 | Belleschi | .......... | H04W 74/0833 |
| | | | | 370/329 |
| 2024/0023151 A1 * | 1/2024 | Ghanbarinejad | .... | H04B 7/0695 |

* cited by examiner

*Primary Examiner* — Brian P Cox
(74) *Attorney, Agent, or Firm* — Harrity & Harrity, LLP

(57) ABSTRACT

Various aspects of the present disclosure generally relate to wireless communication. In some aspects, a first network entity may transmit, to a second network entity, beam configuration information associated with the first network entity, wherein the beam configuration information indicates hierarchical beam relations between one or more wide beams and a plurality of narrow beams. The first network entity may receive, from the second network entity, an indication of a scheduled interference measurement associated with a narrow beam of the plurality of narrow beams based at least in part on the beam configuration information associated with the first network entity. Numerous other aspects are described.

30 Claims, 12 Drawing Sheets

700

700

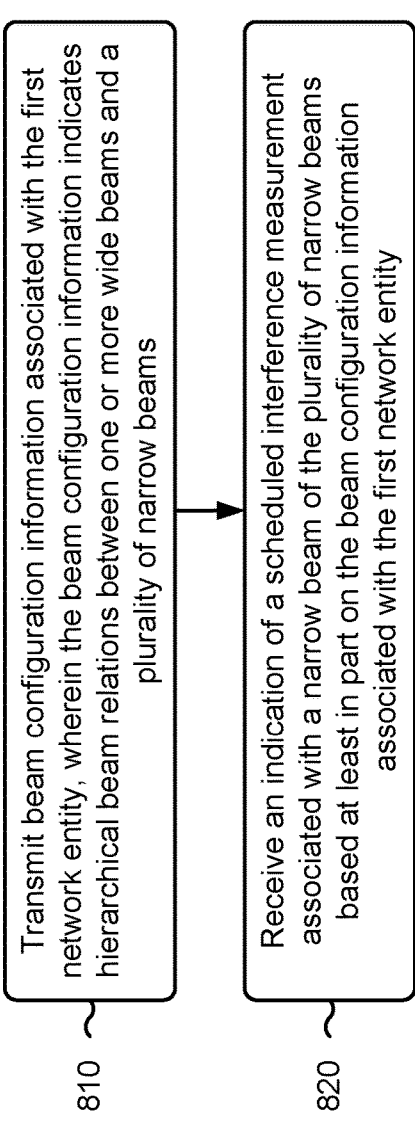

Transmit beam configuration information associated with the first network entity, wherein the beam configuration information indicates hierarchical beam relations between one or more wide beams and a plurality of narrow beams

810

Receive an indication of a scheduled interference measurement associated with a narrow beam of the plurality of narrow beams based at least in part on the beam configuration information associated with the first network entity

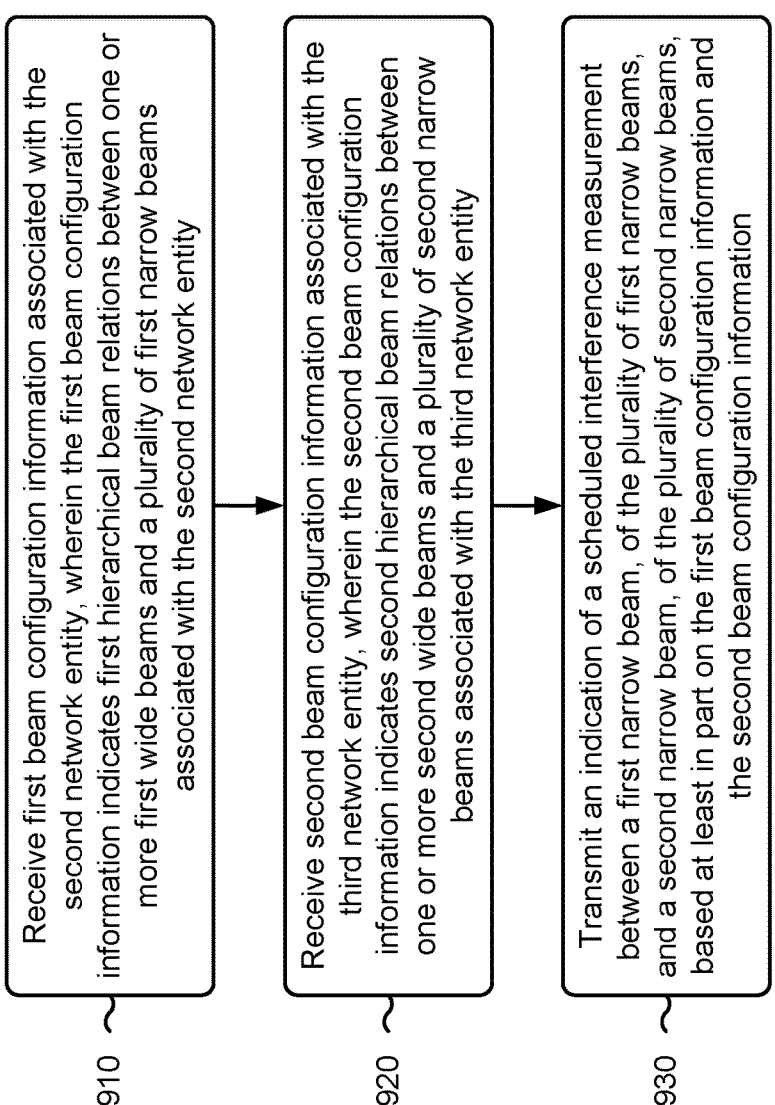

910　Receive first beam configuration information associated with the second network entity, wherein the first beam configuration information indicates first hierarchical beam relations between one or more first wide beams and a plurality of first narrow beams associated with the second network entity 920　Receive second beam configuration information associated with the third network entity, wherein the second beam configuration information indicates second hierarchical beam relations between one or more second wide beams and a plurality of second narrow beams associated with the third network entity 930　Transmit an indication of a scheduled interference measurement between a first narrow beam, of the plurality of first narrow beams, and a second narrow beam, of the plurality of second narrow beams, based at least in part on the first beam configuration information and the second beam configuration information

BEAM CONFIGURATION REPORTING FOR HIERARCHICAL BEAM PAIR IDENTIFICATION

FIELD OF THE DISCLOSURE

Aspects of the present disclosure generally relate to wireless communication and to techniques and apparatuses for beam configuration reporting for hierarchical beam pair identification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network entity for wireless communication. The first network entity may include a memory and one or more processors coupled to the memory. The one or more processors may be configured to transmit, to a second network entity, beam configuration information associated with the first network entity, wherein the beam configuration information indicates hierarchical beam relations between one or more wide beams and a plurality of narrow beams. The one or more processors may be configured to receive, from the second network entity, an indication of a scheduled interference measurement associated with a narrow beam of the plurality of narrow beams based at least in part on the beam configuration information associated with the first network entity.

Some aspects described herein relate to a first network entity for wireless communication. The first network entity may include a memory and one or more processors coupled to the memory. The one or more processors may be configured to receive, from a second network entity, first beam configuration information associated with the second network entity, wherein the first beam configuration information indicates first hierarchical beam relations between one or more first wide beams and a plurality of first narrow beams associated with the second network entity. The one or more processors may be configured to receive, from a third network entity, second beam configuration information associated with the third network entity, wherein the second beam configuration information indicates second hierarchical beam relations between one or more second wide beams and a plurality of second narrow beams associated with the third network entity. The one or more processors may be configured to transmit, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information.

Some aspects described herein relate to a method of wireless communication performed by a first network entity. The method may include transmitting, to a second network entity, beam configuration information associated with the first network entity, wherein the beam configuration information indicates hierarchical beam relations between one or more wide beams and a plurality of narrow beams. The method may include receiving, from the second network entity, an indication of a scheduled interference measurement associated with a narrow beam of the plurality of narrow beams based at least in part on the beam configuration information associated with the first network entity.

Some aspects described herein relate to a method of wireless communication performed by a first network entity. The method may include receiving, from a second network entity, first beam configuration information associated with the second network entity, wherein the first beam configuration information indicates first hierarchical beam relations between one or more first wide beams and a plurality of first narrow beams associated with the second network entity. The method may include receiving, from a third network entity, second beam configuration information associated with the third network entity, wherein the second beam configuration information indicates second hierarchical beam relations between one or more second wide beams and a plurality of second narrow beams associated with the third network entity. The method may include transmitting, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information.

Some aspects described herein relate to a non-transitory computer-readable medium that stores a set of instructions for wireless communication by a first network entity. The set of instructions, when executed by one or more processors of the first network entity, may cause the first network entity to transmit, to a second network entity, beam configuration information associated with the first network entity, wherein the beam configuration information indicates hierarchical beam relations between one or more wide beams and a plurality of narrow beams. The set of instructions, when executed by one or more processors of the first network entity, may cause the first network entity to receive, from the second network entity, an indication of a scheduled interference measurement associated with a narrow beam of the plurality of narrow beams based at least in part on the beam configuration information associated with the first network entity.

Some aspects described herein relate to a non-transitory computer-readable medium that stores a set of instructions for wireless communication by a first network entity. The set of instructions, when executed by one or more processors of the first network entity, may cause the first network entity to receive, from a second network entity, first beam configuration information associated with the second network entity, wherein the first beam configuration information indicates first hierarchical beam relations between one or more first wide beams and a plurality of first narrow beams associated with the second network entity. The set of instructions, when executed by one or more processors of the first network entity, may cause the first network entity to receive, from a third network entity, second beam configuration information associated with the third network entity, wherein the second beam configuration information indicates second hierarchical beam relations between one or more second wide beams and a plurality of second narrow beams associated with the third network entity. The set of instructions, when executed by one or more processors of the first network entity, may cause the first network entity to transmit, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information.

Some aspects described herein relate to an apparatus for wireless communication. The apparatus may include means for transmitting, to a network entity, beam configuration information associated with the apparatus, wherein the beam configuration information indicates hierarchical beam relations between one or more wide beams and a plurality of narrow beams. The apparatus may include means for receiving, from the network entity, an indication of a scheduled interference measurement associated with a narrow beam of the plurality of narrow beams based at least in part on the beam configuration information associated with the apparatus.

Some aspects described herein relate to an apparatus for wireless communication. The apparatus may include means for receiving, from a first network entity, first beam configuration information associated with the first network entity, wherein the first beam configuration information indicates first hierarchical beam relations between one or more first wide beams and a plurality of first narrow beams associated with the first network entity. The apparatus may include means for receiving, from a second network entity, second beam configuration information associated with the second network entity, wherein the second beam configuration information indicates second hierarchical beam relations between one or more second wide beams and a plurality of second narrow beams associated with the second network entity. The apparatus may include means for transmitting, to the first network entity and the second network entity, an indication of a scheduled interference measurement between a first narrow beam, of the plurality of first narrow beams, and a second narrow beam, of the plurality of second narrow beams, based at least in part on the first beam configuration information and the second beam configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-9 are diagrams illustrating example processes associated with hierarchical beam pair identification, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
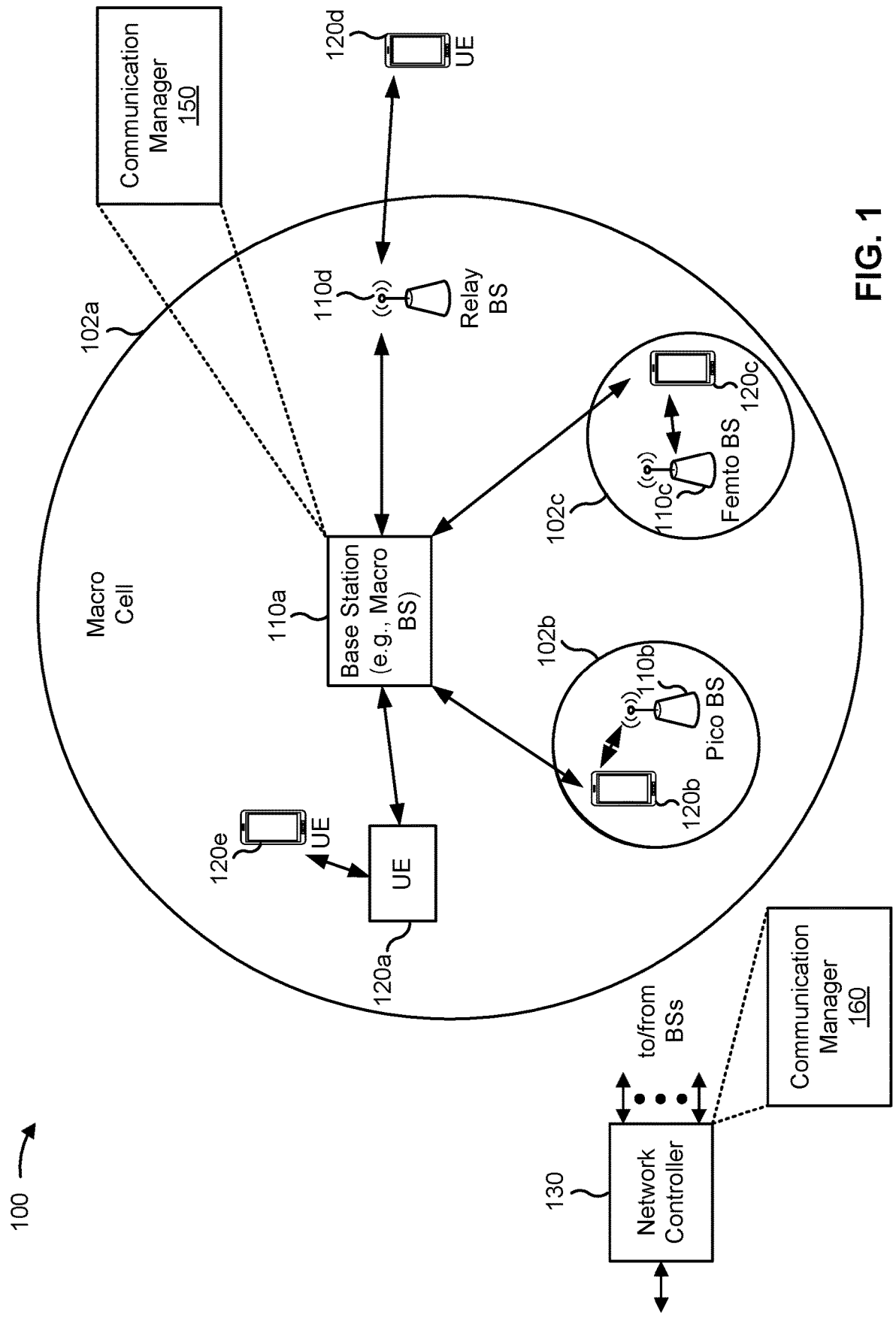
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first network entity (e.g., a base station 110 or one or more components described in connection with FIG. 3) may include a communication manager 150. As described in more detail elsewhere herein, the communication manager 150 may transmit, to a second network entity, beam configuration information associated with the first network entity, wherein the beam configuration information indicates hierarchical beam relations between one or more wide beams and a plurality of narrow beams; and receive, from the second network entity, an indication of a scheduled interference measurement associated with a narrow beam of the plurality of narrow beams based at least in part on the beam configuration information associated with the first network entity. Additionally, or alternatively, the communication manager 150 may perform one or more other operations described herein.

In some aspects, as described in more detail elsewhere herein, the communication manager 150 may receive, from a second network entity, first beam configuration information associated with the second network entity, wherein the first beam configuration information indicates first hierarchical beam relations between one or more first wide beams and a plurality of first narrow beams associated with the second network entity; receive, from a third network entity, second beam configuration information associated with the third network entity, wherein the second beam configuration information indicates second hierarchical beam relations between one or more second wide beams and a plurality of second narrow beams associated with the third network entity; and transmit, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information. Additionally, or alternatively, the communication manager 150 may perform one or more other operations described herein.

In some aspects, a first network entity (e.g., a network controller 130 or another network device) may include a communication manager 160. As described in more detail elsewhere herein, the communication manager 160 may receive, from a second network entity, first beam configuration information associated with the second network entity, wherein the first beam configuration information indicates first hierarchical beam relations between one or more first wide beams and a plurality of first narrow beams associated with the second network entity; receive, from a third network entity, second beam configuration information associated with the third network entity, wherein the second beam configuration information indicates second hierarchical beam relations between one or more second wide beams and a plurality of second narrow beams associated with the third network entity; and transmit, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information. Additionally, or alternatively, the communication manager 160 may perform one or more other operations described herein.

As indicated above, FIG. 1 is provided as an example. Other examples may differ from what is described with regard to FIG. 1.

Figure 2:
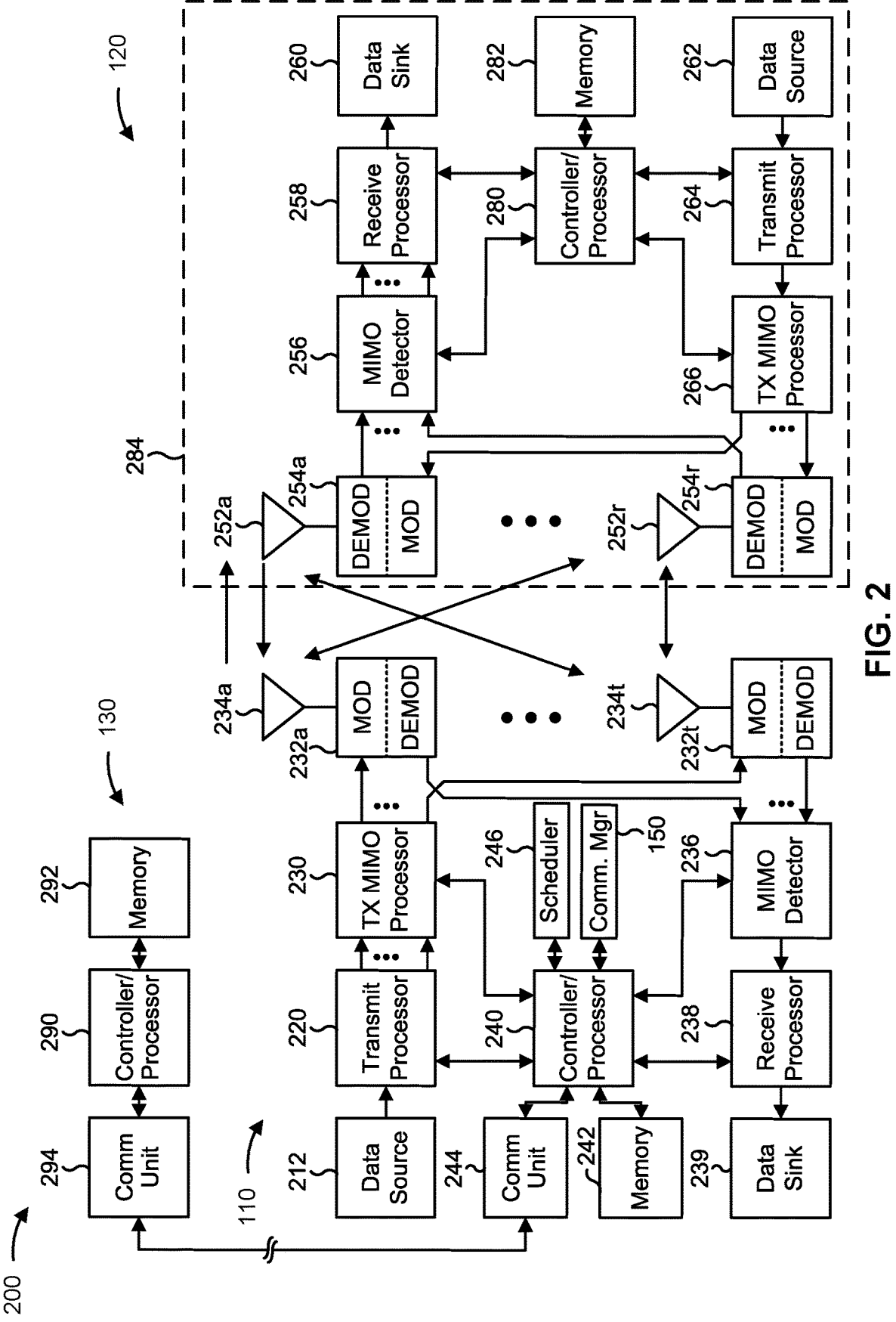
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6, 7A, 7B, and 8-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6, 7A, 7B, and 8-11).

The controller/processor 240 of the base station 110, the controller/processor 280 of the UE 120, and/or any other component(s) of FIG. 2 may perform one or more techniques associated with beam configuration reporting for hierarchical beam pair identification, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples. In some aspects, a network entity described herein is the base station 110, is included in the base station 110, or includes one or more components of the base station 110 shown in FIG. 2. In some aspects, a network entity described herein is the base station 110, is included in the base station 110, or includes one or more components of the base station 110 shown in FIG. 2. In some aspects, a network entity described herein is, is included in, or includes one or more components of the network controller 130 (as shown in FIG. 2) or another network device.

In some aspects, a first network entity includes means for transmitting, to a second network entity, beam configuration information associated with the first network entity, wherein the beam configuration information indicates hierarchical beam relations between one or more wide beams and a plurality of narrow beams; and/or means for receiving, from the second network entity, an indication of a scheduled interference measurement associated with a narrow beam of the plurality of narrow beams based at least in part on the beam configuration information associated with the first network entity. In some aspects, the means for the first network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a first network entity includes means for receiving, from a second network entity, first beam configuration information associated with the second network entity, wherein the first beam configuration information indicates first hierarchical beam relations between one or more first wide beams and a plurality of first narrow beams associated with the second network entity; means for receiving, from a third network entity, second beam configuration information associated with the third network entity, wherein the second beam configuration information indicates second hierarchical beam relations between one or more second wide beams and a plurality of second narrow beams associated with the third network entity; and/or means for transmitting, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information. In some aspects, the means for the first network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network entity to perform operations described herein may include, for example, one or more of communication manager 160, communication unit 294, controller/processor 290, or memory 292.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base-station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
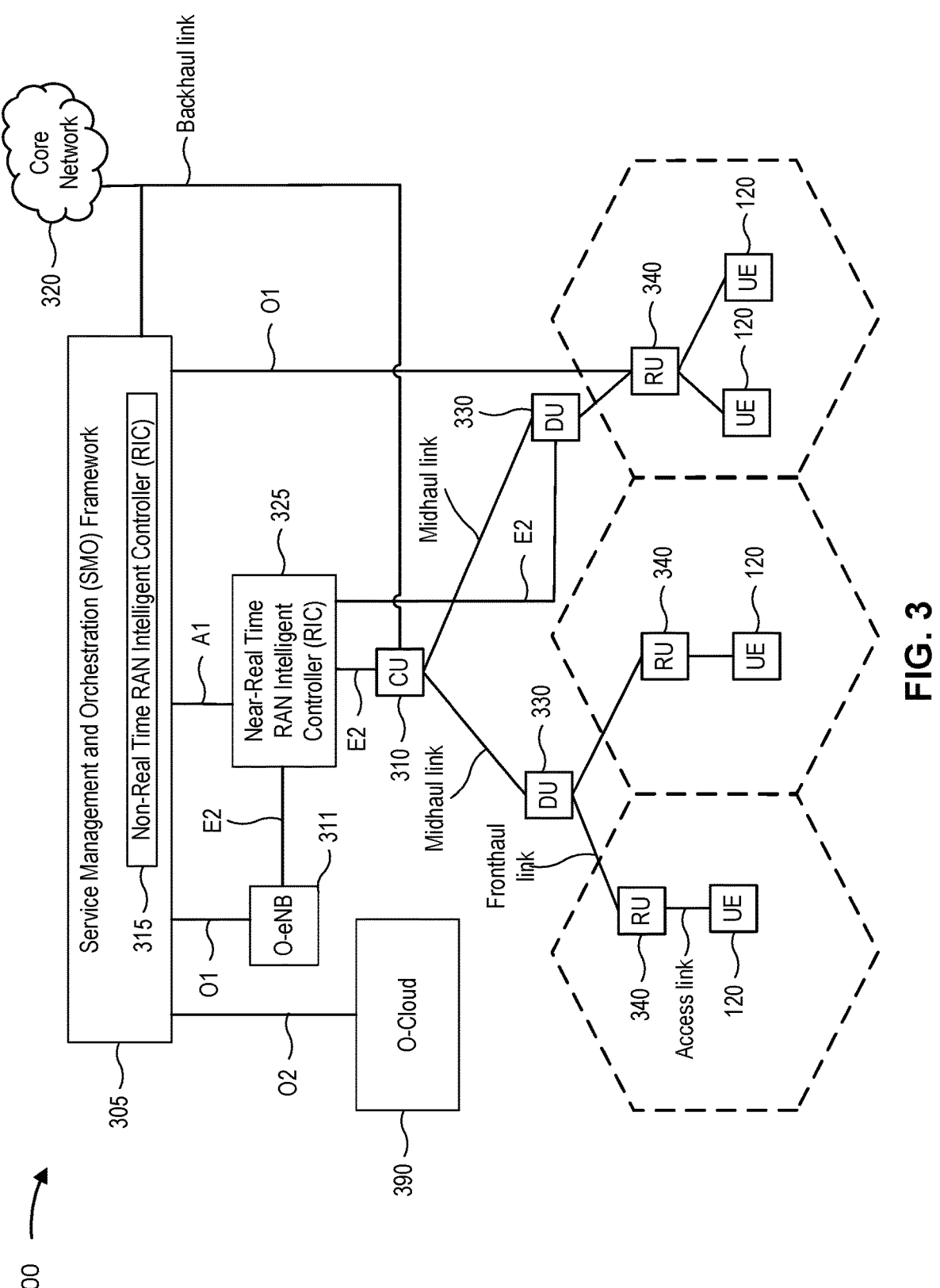
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT MC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with respect to FIG. 3.

Figures 4A, 4B, 4C:
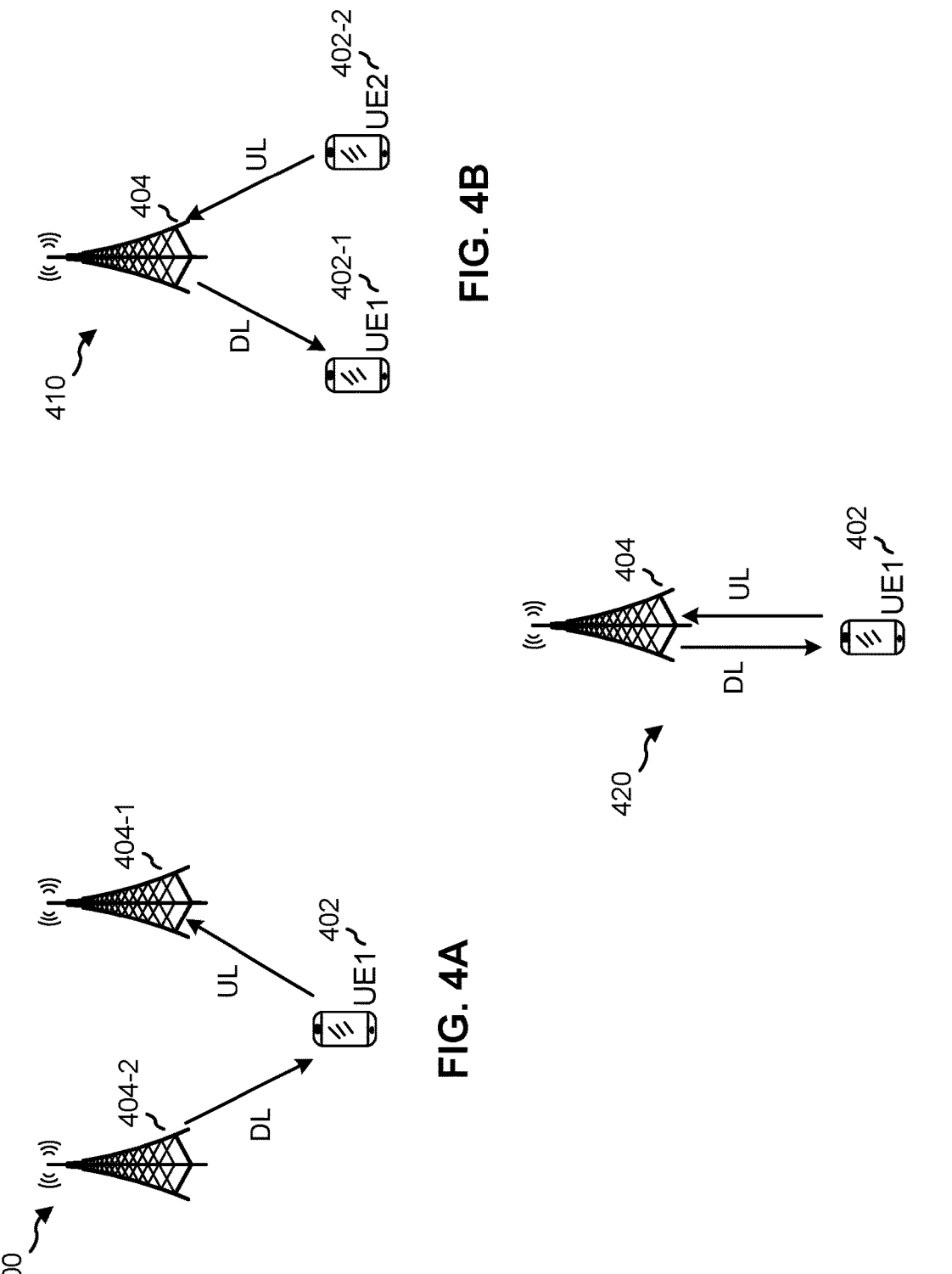
FIGS. 4A-4C are diagrams illustrating examples of full duplex (FD) communication in accordance with the present disclosure.

FIGS. 4A-4C are diagrams illustrating examples 400, 410, 420 of full duplex (FD) communication in accordance with the present disclosure. "Full-duplex communication" (or "FD communication") in a wireless network refers to simultaneous bi-directional communication between devices in the wireless network. For example, base station operating in an FD mode may transmit a downlink communication and receive an uplink communication at the same time (e.g., in the same slot or the same symbol). A UE operating in an FD mode may transmit an uplink communication and receive a downlink communication at the same time (e.g., in the same slot or the same symbol). "Half-duplex communication" (or "HD communication") in a wireless network refers to unidirectional communications (e.g., only downlink communication or only uplink communication) between devices at a given time (e.g., in a given slot or a given symbol).

The example 400 of FIG. 4A includes a UE1 402 and two base stations (e.g., TRPs) 404-1, 404-2, where the UE1 402 is sending UL transmissions to base station 404-1 and is receiving DL transmissions from base station 404-2. In the example 400 of FIG. 4A, FD is enabled for the UE1 402, but not for the base stations 404-1, 404-2. The example 410 of FIG. 4B includes two UEs, shown as UE1 402-1 and UE2 402-2, and a base station 404, where the UE1 402-1 is receiving a DL transmission from the base station 404 and the UE2 402-2 is transmitting an UL transmission to the base station 404. In the example 410 of FIG. 4B, FD is enabled for the base station 404, but not for UE1 402-1 and UE2 402-2. The example 420 of FIG. 4C includes a UE1 402 and a base station 404, where the UE1 402 is receiving a DL transmission from the base station 404 and the UE1 402 is transmitting an UL transmission to the base station 404. In the example 420 of FIG. 4C, FD is enabled for both the UE1 402 and the base station 404.

As shown in the examples 400, 410, and 420 of FIGS. 4A, 4B, and 4C, respectively, FD capability may be present at the base station (e.g., base station 404), at the UE (e.g., UE1 402), or at both the base station and the UE. In cases in which FD capability is present at the UE (e.g., in the examples 400 and 420), the UE may use one antenna panel for uplink transmission and another antenna panel for downlink reception. In cases in which FD capability is present at the base station (e.g., in the examples 410 and 420), the base station may use one antenna panel for downlink transmission and another antenna panel for uplink reception. In some examples, FD capability for a device (e.g., a UE or a base station) may be conditional on beam separation between the beams used for simultaneous downlink and uplink communications and/or other factors relating to self-interference between the downlink and uplink communications and/or interference due to clutter echo. For example, FD capability for a device may be conditional on whether there is sufficient spatial separation between the beams used for the simultaneous downlink and uplink communications to limit interference between the beams used for the simultaneous downlink and uplink communications. In some aspects, FD communications may result in reduced traffic latency, enhanced spectrum efficiency (e.g., per cell, per UE), increased efficiency of resource utilization, and increased network coverage, as compared with half-duplex (HD) communications.

As indicated above, FIGS. 4A-4C are provided as one or more examples. Other examples may differ from what is described with regard to FIGS. 4A-4C.

Figure 5:
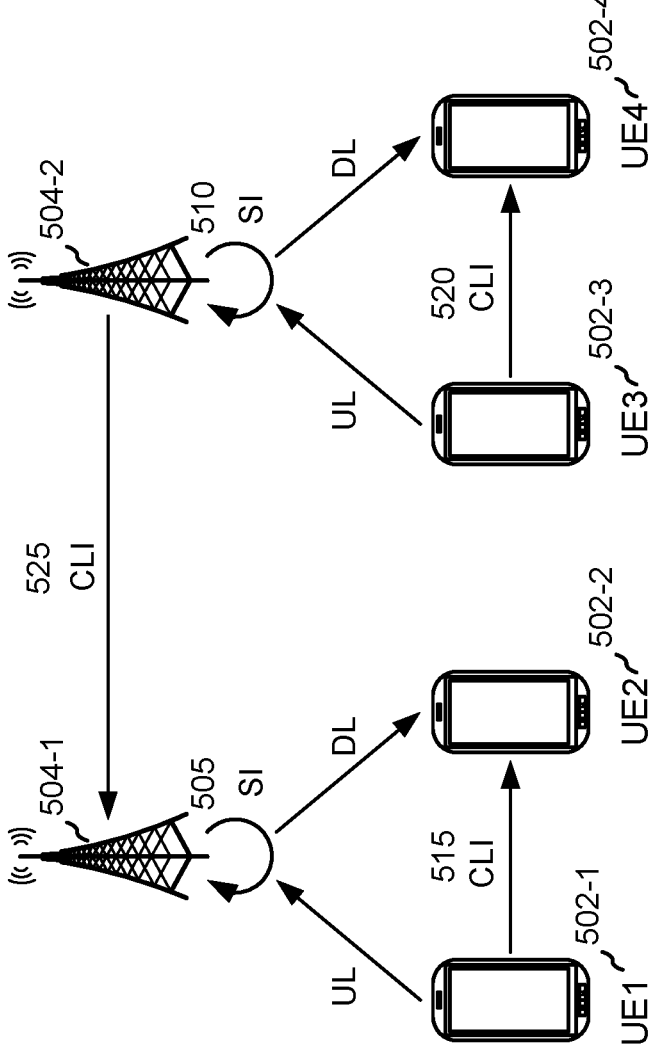
FIG. 5 is a diagram illustrating an example of interference associated with FD communications for two base stations.

FIG. 5 is a diagram illustrating an example 500 of interference associated with FD communications for two base stations, in accordance with the present disclosure. As shown in FIG. 5, example 500 includes four UEs, shown as UE1 502-1, UE2 502-2, UE3 502-3, and UE4 502-4, and two base stations (e.g., TRPs) 504-1 and 504-2. In example 500, FD may be enabled for the base stations 504-1 and 504-2, but not for UE1 502-1, UE2 502-2, UE3 502-3, and UE4 502-4. For example, the base station 504-1 may simultaneously receive an uplink communication from the UE1 502-1 and transmit a downlink transmission to the UE2 502-2, and the base station 504-2 may simultaneously receive an uplink communication from the UE3 502-3 and transmit a downlink transmission to the UE4 502-4.

As shown by reference number 505, the transmission of the downlink communication to the UE2 502-2 by the base station 504-1 may cause self-interference with the reception of the uplink communication from the UE1 502-1. As shown by reference number 510, the transmission of the downlink communication to the UE4 502-4 by the base station 504-2 may cause self-interference with the reception of the uplink communication from the UE3 502-3. As shown by reference number 515, the transmission of the uplink communication to the base station 504-1 by the UE1 502-1 may cause cross-link interference (CLI) with the reception of the downlink communication from the base station 504-1 by the UE2 502-1. As shown by reference number 520, the transmission of the uplink communication to the base station 504-2 by the UE3 502-3 may cause CLI with the reception of the downlink communication from the base station 504-2 by the UE4 502-4. Furthermore, in some cases, simultaneous downlink transmission by one base station (e.g., 504-1 or 504-2) and uplink transmission by another neighboring base station (e.g., 504-1 or 504-2) may result in inter-base station CLI. For example, as shown by reference number 525, the transmission of the downlink communication to the UE4 502-4 by the base station 504-2 may cause CLI with the reception of the uplink communication from the UE1 502-1 by the base station 504-1.

As indicated above, FIG. 5 is provided as an example. Other examples may differ from what is described with respect to FIG. 5.

As described above in connection with FIG. 5, when neighboring base stations perform FD communications, simultaneous downlink transmission by one base station and uplink reception by another base station may result in CLI between the base stations. In addition, simultaneous/overlapping downlink transmission by one base station and uplink reception by another base station, resulting in CLI between the base stations, may also occur for neighboring base stations performing HD communications in a case in which the downlink and uplink slots for the base stations are not aligned. Such CLI between base stations may decrease the reliability of uplink communications received by the base stations. In some aspects, a base station may perform periodic measurements of CLI between beams (e.g., receive (Rx) beams) of that base station and beams (e.g., transmit (Tx) beams) of another base station in order to determine a beam pair for which the CLI between the base stations is low. However, the base stations may use refined narrow beams for downlink and uplink communications, and a large number of narrow beams may be associated with each base station. Accordingly, periodic CLI measurements between different combinations of narrow beams associated with the base stations may result in a large overhead of resources (e.g., time and frequency resources), which may result in increased latency for traffic to and from the base stations.

Some techniques and apparatuses described herein enable hierarchical beam pair identification for simultaneous downlink and uplink communications by first and second network entities. In some aspects, a first network entity may transmit, to a coordinator network entity, beam configuration information associated with the first network entity, and a second network entity may transmit, to the coordinator network entity, beam configuration information associated with the second network entity. The beam configuration information associated with the first network entity may indicate hierarchical beam relations between one or more wide beams and a plurality of narrow beams associated with the first network entity, and the beam configuration information associated with the second network entity may indicate hierarchical beam relations between one or more wide beams and a plurality of narrow beams associated with the second network entity. The coordinator network entity may transmit, to the first network entity and the second network entity, indication of a scheduled interference measurement between a first narrow beam associated with the first network entity and a second narrow beam associated with the second network entity based at least in part on the beam configuration information received from the first network entity and the second network entity. The first network entity and/or the second network entity may perform the scheduled interference measurement for the beam pair (e.g., the first narrow beam and the second beam), and the interference measurement may be used to determine whether the beam pair is a compatible beam pair. In some aspects, the coordinator network entity may identify the beam pair (e.g., the first narrow beam and the second narrow beam) for the scheduled interference measurement in a hierarchical manner based at least in part on the hierarchical beam relations indicated in the beam configuration information. As a result, the overhead of resources for scheduled interference measurements between narrow beams associated with the first network entity and the second network entity may be reduced and traffic latency may be decreased, as compared with periodic interference measurements between different pairs of narrow beams.

Some techniques and apparatuses described herein enable a first network entity to transmit, to a second network entity, beam configuration information associated with the first network entity. The beam configuration information may indicate hierarchical beam relations between one or more wide beams and a plurality of narrow beams. The first network entity may receive, from the second network entity, an indication of a scheduled interference measurement associated with a narrow beam of the plurality of narrow beams based at least in part on the beam configuration information associated with the first network entity. As a result, the overhead of resources used by the first network entity for narrow beam interference measurements may be reduced, and traffic latency for the first network entity may be decreased, as compared with periodic interference measurements for the plurality of narrow beams.

Some techniques and apparatuses described herein enable a first network entity to receive, from a second network entity, first beam configuration information associated with the second network entity, and receive, from a third network entity, second beam configuration information associated with the third network entity. The first beam configuration information may indicate first hierarchical beam relations between one or more first wide beams and a plurality of first narrow beams associated with the second network entity, and the second beam configuration information may indicate second hierarchical beam relations between one or more second wide beams and a plurality of second narrow beams associated with the third network entity. The first network entity may transmit, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information. As a result, the overhead of resources used by the second network entity and the third network entity for scheduled interference measurements between narrow beams associated with the second network entity and the third network entity may be reduced, and traffic latency may be decreased, as compared with periodic interference measurements between narrow beams of the second network entity and the third network entity.

Figure 6:
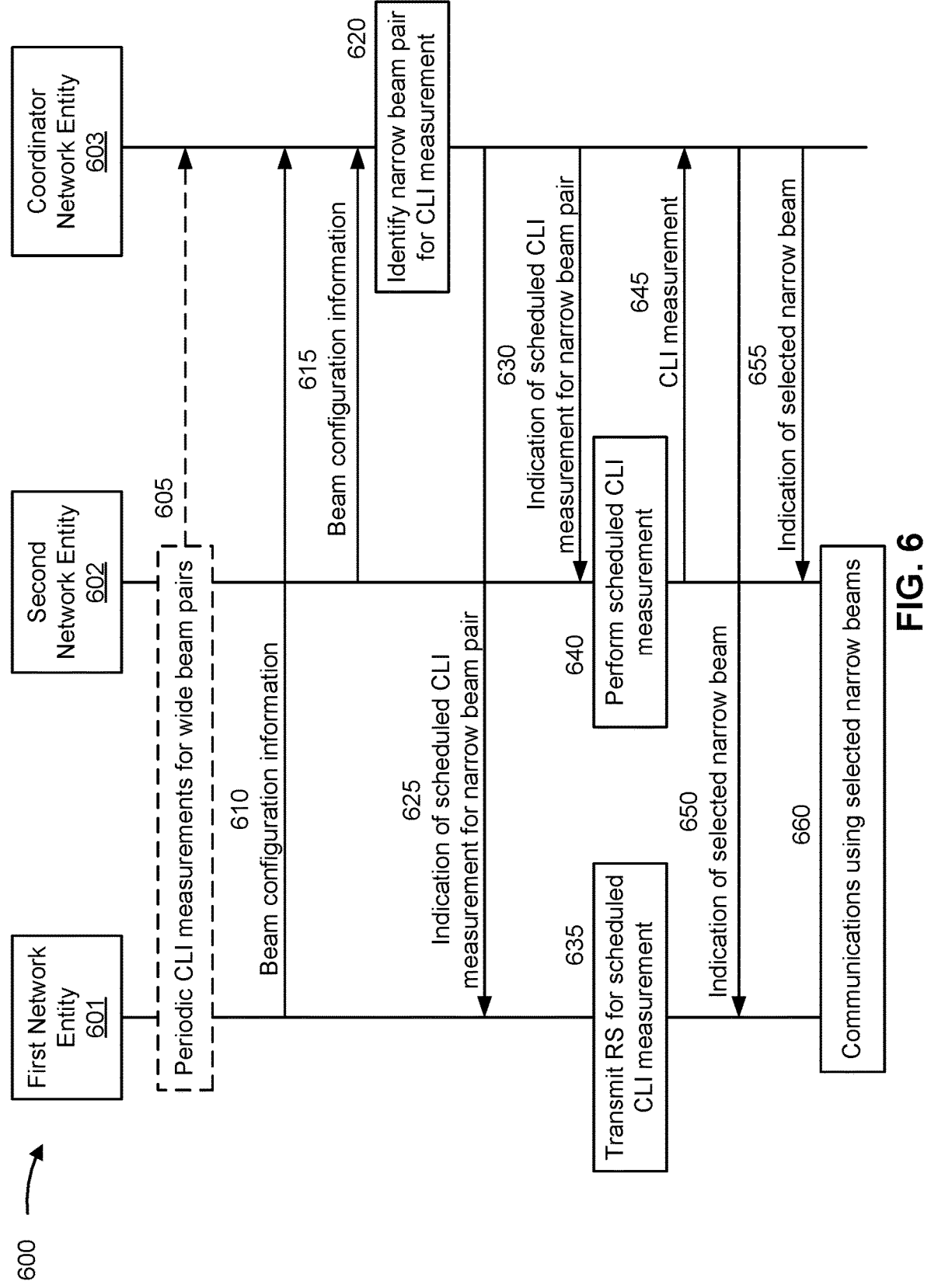
FIGS. 6, 7A, and 7B are diagrams illustrating examples associated with beam configuration reporting for hierarchical beam pair identification, in accordance with the present disclosure.

FIG. 6 is a diagram illustrating an example 600 associated with beam configuration reporting for hierarchical beam pair identification, in accordance with the present disclosure. As shown in FIG. 6, example 600 includes communication between a first network entity 601, a second network entity 602, and a coordinator network entity 603. "Network entity" may refer to a base station 110, a CU 310, a DU 330, an RU 340, a network control 130, a Near-RT RIC 325, a Non-RT RIC 315, an SMO framework 305, a central coordinator device, an operations, administration, and management (OAM) device, another network device or network node, or any combination thereof.

In some aspects, the first network entity 601 may be a base station 110, a CU 310, a DU 330, an RU 340, or a combination thereof. In some aspects, the second network entity 602 may be a base station 110, a CU 310, a DU 330, an RU 340, or a combination thereof. In some aspects, the first network entity 601 may be or may include a first DU, and the second network entity 602 may be or may include a second DU. In some aspects, the first network entity 601 may be or may include a first CU, and the second network entity 602 may be or may include a second CU.

The coordinator network entity 603 may be a network entity (e.g., a third network entity) that coordinates and/or manages one or more interference measurements (e.g., CLI measurements) between one or more beams associated with the first network entity 601 and one or more beams associated with the second network entity 602. In some aspects, the coordinator network entity 603 may be or may include a central coordinator device, such as an OAM device. "OAM device" may refer to a network entity (e.g., a network controller 130, a Near-RT RIC 325, a Non-RT RIC 315, an SMO framework 305, another network device, or a combination thereof) that performs one or more OAM functions relating to the first network entity 601 and the second network entity 602. In some aspects, the coordinator network entity 603 may be or may include a CU. For example, the CU may be a peer CU with respect to the first network entity 601 and the second network entity 602 (e.g., in a case of distributed coordination of the interference measurements between the beams associated with the first network entity 601 and the beams associated with the second network entity 602).

In some aspects, the first network entity 601 and the second network entity 602 may each be capable of transmitting and receiving communications and/or signals using wide beams or narrow beams. "Wide beams" may refer to first beams (e.g., beams associated with a first type of reference signal) having a first beam width, and "narrow beams" may refer to second beams (e.g., beams associated with a second type of reference signal) having a second beam width that is narrower than the first beam width. In some aspects, the wide beams associated with a network entity (e.g., the first network entity 601 or the second network entity 602) may be synchronization and signal block (SSB) beams (e.g., beams used for transmitting SSBs), and the narrow beams associated with a network entity (e.g., the first network entity 601 or the second network entity 602) may be channel state information (CSI) reference signal (CSI-RS) beams (e.g., beams used for transmitting CSI-RSs).

As shown in FIG. 6, and by reference number 605, the first network entity 601 and/or the second network entity 602 may perform periodic CLI measurements for wide beam pairs. A wide beam pair may include a first wide beam (e.g., a first SSB beam) associated with the first network entity 601 and a second wide beam (e.g., a second SSB beam) associated with the second network entity 602, and the CLI measurement for the wide beam pair may be a CLI measurement between the first wide beam and the second wide beam. In some aspects, the first network entity 601 and/or the second network entity 602 may be configured to perform periodic CLI measurements between different combinations of first wide beams associated with the first network entity 601 and second wide beams associated with the second network entity 602. For example, the first network entity 601 and/or the second network entity 602 may perform a respective periodic CLI measurement for each possible combination of a first SSB beam from a first set of SSB beams associated the first network entity 601 and a second SSB beam from a second set of SSB beams associated with the second network entity 602.

In some aspects, the periodic CLI measurement for a wide beam pair may be a measurement of the CLI on the first wide beam caused by transmission on the second wide beam. In this case, the second network entity 602 may transmit a reference signal on the second wide beam, and the first network entity 601 may measure the CLI on the first wide beam based at least in part on the reference signal transmitted on the second beam by the second network entity 602. In some aspects, the periodic CLI measurement for a wide beam pair may be a measurement of the CLI on the second wide beam caused by transmission on the first wide beam. In this case, the first network entity 601 may transmit a reference signal on the first wide beam, and the second network entity 602 may measure the CLI on the second wide beam based at least in part on the reference signal transmitted on the first beam by the first network entity 601. For example, the CLI measurements for the wide beam pairs performed by the first network entity 601 and/or the second network entity 602 may include measurements of one or more CLI metrics (e.g., an RSRP, an RSSI, a signal-to-noise ratio (SNR), and/or a signal-to-interference-plus-noise ratio (SINR)).

In some aspects, the first network entity 601 and/or the second network entity 602 may transmit indications of the periodic CLI measurements for the wide beam pairs to the coordinator network entity 603. The coordinator network entity 603 may receive the indications of the periodic CLI measurements for the wide beam pairs transmitted by the first network entity 601 and/or the second network entity 602. For example, the first network entity 601 may transmit, to the coordinator network entity 603, indications of periodic CLI measurements, performed by the first network entity 601, for one or more wide beam pairs. Additionally, or alternatively, the second network entity 602 may transmit, to the coordinator network entity 603, indications of periodic CLI measurements, performed by the second network entity 602, for one or more wide beam pairs. For example, the indication of a periodic CLI measurement for a wide beam pair may indicate one or more CLI metrics (e.g., the RSRP, the RSSI, the SNR, and/or the SINR) measured for the wide beam pair. In some aspects, the indication of a periodic CLI measurement for a wide beam pair may also include information that identifies the wide beam pair (e.g., the first wide beam associated with the first network entity 601 and the second wide beam associated with the second network entity 602) for which the periodic CLI measurement is being reported to the coordinator network entity 603.

As further shown in FIG. 6, and by reference number 610, the first network entity 601 may transmit, to the coordinator network entity 603, beam configuration information (e.g., first beam configuration information) associated with the first network entity 601. The coordinator network entity 603 may receive the beam configuration information transmitted by the first network entity 601. The beam configuration information may indicate hierarchical beam relations (e.g., first hierarchical beam relations) between one or more wide beams (e.g., SSB beams) and a plurality of narrow beams (e.g., CSI-RS beams) associated with the first network entity 601. In some aspects, the beam configuration information may also indicate one or more applicable downlink and/or uplink frequency intervals for the hierarchical beam relations. For example, an applicable frequency interval may be a carrier (CC), a CC group, a frequency band, or a bandwidth part (BWP). In some aspects, the beam configuration information may indicate hierarchical beam relations per CC, per CC group, per frequency band, or per BWP. In some aspects, the beam configuration information may indicate the hierarchical beam relations between the wide beams and the narrow beams associated with the first network entity 601 for the corresponding cells in the applicable frequency interval.

The hierarchical beam relations may indicate a beam hierarchy for the first network entity 601 that includes one or more wide beams and a respective set of narrow beams associated with each wide beam of the one or more wide beams. For example, the hierarchical beam relations may indicate, for one or more SSB beams, a respective set of CSI-beams associated with each SSB beam. In some aspects, the set of narrow beams associated with a wide beam may include a number of narrow beams that are formed within the wide beam (e.g., within the beam width of the wide beam). In some aspects, the hierarchical beam relations for the first network entity 601 may be indicated by transmission configuration indicator (TCI) state per downlink reference signal, which may be common for the applicable frequency interval. In this case, each narrow beam may correspond to a respective downlink reference signal (e.g., a respective CSI-RS), and the beam configuration information associated with the first network entity 601 may indicate the hierarchical beam relations by indicating, for each narrow beam, the TCI state for the respective downlink reference signal. For example, the beam configuration information may include an indication of a respective TCI state for each CSI-RS beam of a plurality of CSI-RS beams, and, for each CSI-RS beam, a quasi co-location (QCL) source of the respective TCI state indicates the SSB beam associated with that CSI-RS beam. In this case, the TCI for a CSI-RS beam may indicate that the CSI-RS beam is a narrow beam within an SSB beam if the SSB is the QCL source in the TCI applied to the CSI-RS.

In some aspects, the one or more wide beams (e.g., SSB beams) that are included in the hierarchical beam relations for the first network entity 601 may include all of the wide beams (e.g., SSB beams) associated with the first network entity 601 that are included in wide beam pairs for which the periodic CLI measurements are performed. In some aspects, the one or more wide beams (e.g., SSB beams) that are included in the hierarchical beam relations for the first network entity 601 may include a subset of the wide beams (e.g., SSB beams) associated with the first network entity 601 that are included in the wide beam pairs for which the periodic CLI measurements are performed.

As further shown in FIG. 6, and by reference number 615, the second network entity 602 may transmit, to the coordinator network entity 603, beam configuration information (e.g., second beam configuration information) associated with the second network entity 602. The coordinator network entity 603 may receive the beam configuration information transmitted by the second network entity 602. The beam configuration information associated with the second network entity 602 may indicate hierarchical beam relations between one or more wide beams (e.g., SSB beams) and a plurality of narrow beams (e.g., CSI-RS beams) associated with the second network entity 602. In some aspects, the beam configuration information associated with the second network entity 602 may also indicate one or more applicable downlink and/or uplink frequency intervals for the hierarchical beam relations. For example, the beam configuration information may indicate hierarchical beam relations per CC, per CC group, per frequency band, or per BWP. In some aspects, the beam configuration information may indicate the hierarchical beam relations between the wide beams and the narrow beams associated with the second network entity 602 for the corresponding cells in the applicable frequency interval.

The hierarchical beam relations may indicate a beam hierarchy for the second network entity 602 that includes one or more wide beams and a respective set of narrow beams associated with each wide beam of the one or more wide beams. For example, the hierarchical beam relations may indicate, for one or more SSB beams, a respective set of CSI-beams associated with each SSB beam. In some aspects, the hierarchical beam relations for the second network entity 602 may be indicated by TCI state per downlink reference signal, which may be common for the applicable frequency interval. In this case, each narrow beam may correspond to a respective downlink reference signal (e.g., a respective CSI-RS), and the beam configuration information associated with the second network entity 602 may indicate the hierarchical beam relations by indicating, for each narrow beam, the TCI state for the respective downlink reference signal. For example, the beam configuration information may include an indication of a respective TCI state for each CSI-RS beam of a plurality of CSI-RS beams, and, for each CSI-RS beam, a QCL source of the respective TCI state indicates the SSB beam associated with that CSI-RS beam. In this case, the TCI for a CSI-RS beam may indicate that the CSI-RS beam is a narrow beam within an SSB beam if the SSB is the QCL source in the TCI applied to the CSI-RS.

In some aspects, the one or more wide beams (e.g., SSB beams) that are included in the hierarchical beam relations for the second network entity 602 may include all of the wide beams (e.g., SSB beams) associated with the second network entity 602 that are included in wide beam pairs for which the periodic CLI measurements are performed. In some aspects, the one or more wide beams (e.g., SSB beams) that are included in the hierarchical beam relations for the second network entity 602 may include a subset of the wide beams (e.g., SSB beams) associated with the second network entity 602 that are included in the wide beam pairs for which the periodic CLI measurements are performed.

As further shown in FIG. 6, and by reference number 620, the coordinator network entity 603 may identify a narrow beam pair for a CLI measurement based at least in part on the beam configuration information (e.g., the first beam configuration information) received from the first network entity 601 and the beam configuration information (e.g., the second beam configuration information) received from the second network entity 602. In some aspects, the coordinator network entity 603 may identify a narrow beam pair for which to schedule a CLI measurement based at least in part on the periodic CLI measurements for the wide beam pairs and based at least in part on the hierarchical beam relations indicated in the beam configuration information received from the first network entity 601 and the second network entity 602.

In some aspects, based at least in part on the indications of the periodic CLI measurements for one or more wide beam pairs received from the first network entity 601 and/or the second network entity 602, the coordinator network entity 603 may identify a compatible wide beam pair with a low CLI measurement. In some aspects, a "compatible" wide beam pair may refer to a wide beam pair, including a first wide beam associated with the first network entity 601 and a second wide beam associated with the second network entity 602, with a CLI measurement between the first wide beam and the second wide that satisfies a threshold. For example, the coordinator network entity 603 may identify a first wide beam (e.g., a first SSB beam) associated with the first network entity 601 and a second wide beam (e.g., a second SSB beam) associated with the second network entity 602 in connection with a determination that a CLI measurement between the first wide beam and the second wide beam satisfies the threshold.

In some aspects, the coordinator network entity 603 may identify the narrow beam pair for which to schedule the CLI measurement based at least in part on the compatible wide beam pair identified by the coordinator network entity 603. The narrow beam pair may include a first narrow beam (e.g., a first CSI-RS beam) associated with the first network entity 601 and a second narrow beam (e.g., a second CSI-RS beam) associated with the second network entity 602. In some aspects, the first narrow beam (e.g., the first CSI-RS beam) may be a narrow beam associated with (e.g., within) the first wide beam of the compatible wide beam pair, and the second narrow beam (e.g., the second CSI-RS beam) may be a narrow beam associated with (e.g., within) the second wide beam of the compatible wide beam pair. The hierarchical beam relations indicated in the beam configuration information associated with the first network entity 601 may indicate a first set narrow beams (e.g., CSI-RS beams) that are associated with (e.g., within) the first wide beam of the compatible wide beam pair. The hierarchical beam relations indicated in the beam configuration information associated with the second network entity 602 may indicate a second set narrow beams (e.g., CSI-RS beams) that are associated with (e.g., within) the second wide beam of the compatible wide beam pair. In some aspects, the coordinator network entity 603, based at least in part on the hierarchical relations indicated in the beam configuration information associated with the first network entity 601, may select the first narrow beam from the first set of narrow beams associated with (e.g., within) the first wide beam, and the coordinator network entity 603, based at least in part on the hierarchical relations indicated in the beam configuration information associated with the second network entity 602, may select the second narrow beam from the second set of narrow beams associated with (e.g., within) the second wide beam.

The coordinator network entity 603 may schedule a CLI measurement for the narrow beam pair (e.g., a CLI measurement between the first narrow beam associated with the first network entity 601 and the second narrow beam associated with the second network entity 602). For example, the coordinator network entity 603 may schedule an aperiodic CLI measurement between the first narrow beam and the second narrow beam, or the coordinator network entity 603 may schedule a semi-persistent CLI measurement between the first narrow beam and the second narrow beam. In some aspects, the coordinator network entity 603 may schedule CLI measurements for multiple narrow beam pairs identified based at least in part on the compatible wide beam pair. For example, the coordinator network entity 603 may schedule CLI measurements for each narrow beam pair combination from the first set of narrow beams associated with the first wide beam and the second set of narrow beams associated with the second wide beam. In this way, the scheduled CLI measurement may verify whether each narrow beam pair identified in connection with the compatible wide beam pair also have low CLI.

As further shown in FIG. 6, and by reference number 625, the coordinator network entity 603 may transmit, to the first network entity 601, an indication of the scheduled CLI measurement for the narrow beam pair. The first network entity 601 may receive the indication of the scheduled CLI measurement for the narrow beam pair from the coordinator network entity 603. As shown by reference number 630, the coordinator network entity 603 may transmit, to the second network entity 602, an indication of the scheduled CLI measurement for the narrow beam pair. In some aspects, one of the first network entity 601 or the second network entity 602 may be a victim node for the scheduled CLI measurement, and the other one of the first network entity 601 or the second network entity 602 may be an aggressor node for the scheduled CLI measurement. The victim node may perform the scheduled CLI measurement to measure the CLI on an Rx beam of the victim node resulting from transmission, by the aggressor node, of a reference signal on a Tx beam of the aggressor node.

In some aspects, the indication of the scheduled CLI measurement that is transmitted to the victim node may indicate resources (e.g., time and frequency resources) for performing the CLI measurement, and the Rx beam of the victim node on which to perform the CLI measurement. The Rx beam may correspond to the first narrow beam of the narrow beam pair for which the CLI measurement is scheduled (e.g., in a case in which the first network entity 601 is the victim node), or the Rx beam may correspond to the second narrow beam of the narrow beam pair for which the CLI measurement is scheduled (e.g., in a case in which the second network entity 602 is the victim node). In some aspects, the Rx beam may be indicated by indicating a reference signal (e.g., a downlink reference signal) transmitted by the victim node. For example, the indication of the scheduled interference measurement that is transmitted to the victim UE, may include an indication of a downlink reference signal associated with the victim UE (e.g., the first network entity 601 or the second network entity 602), and the Rx beam on which the CLI measurement is to be performed may be the Rx beam of the victim node that corresponds to the beam used by the victim node to transmit the indicated downlink reference signal.

In some aspects, the indication of the scheduled CLI measurement that is transmitted to the aggressor node may indicate resources (e.g., the same time and frequency resources as indicated to the victim device for performing the CLI measurement) for transmitting a reference signal associated with the CLI measurement, and the Tx beam on which the transmit the reference signal associated with the CLI measurement. The Tx beam of the aggressor node may correspond to the first narrow beam of the narrow beam pair for which the CLI measurement is scheduled (e.g., in a case in which the first network entity 601 is the aggressor node), or the Tx beam may correspond to the second narrow beam of the narrow beam pair for which the CLI measurement is scheduled (e.g., in a case in which the second network entity 602 is the aggressor node).

As shown in FIG. 6, in some aspects, the first network entity 601 may be the aggressor node for the scheduled CLI measurement, and the second network entity 602 may be the victim node for the scheduled CLI measurement. In this case, the indication of the scheduled CLI measurement that is transmitted to the first network entity 601 may schedule a transmission, by the first network entity 601, of a reference signal on the first narrow beam (e.g., the first CSI-RS beam) of the narrow beam pair, and the indication of the scheduled CLI measurement that is transmitted to the second network entity 602 may indicate the resources (e.g., time and frequency resources) for performing the CLI measurement, by the second network entity 602, on the second narrow beam (e.g., on an Rx beam corresponding to the second CSI-RS beam).

As further shown in FIG. 6, and by reference number 635, the first network entity 601 may transmit a reference signal on the first narrow beam (e.g., the first CSI-RS beam) of the narrow beam pair in accordance with the indication of the scheduled CLI measurement received from the coordinator network entity 603 (e.g., in the case in which the first network entity 601 is the aggressor node). As shown by reference number 640, the second network entity 602 may perform a CLI measurement on the second narrow beam (e.g., the second CSI-RS) of the narrow beam pair (e.g., to measure the CLI on the second narrow beam from the transmission of the reference signal on the first narrow beam by the first network entity 601) in accordance with the indication of the scheduled CLI measurement received from the coordinator network entity 603. For example, the second network entity 602 may measure one or more CLI metrics (e.g., an RSRP, an RSSI, an SNR, and/or an SINR) on the second narrow beam.

As further shown in FIG. 6, and by reference number 645, the second network entity 602 may transmit, to the coordinator network entity 603, an indication of the CLI measurement for the narrow beam pair (e.g., the CLI, from the first narrow beam, measured on the second narrow beam) performed by the second network entity 602. The coordinator network entity 603 may receive the indication of the CLI measurement for the narrow beam pair transmitted by the second network entity 602. For example, the indication of the CLI measurement for the narrow beam pair may indicate one or more CLI metrics (e.g., the RSRP, the RSSI, the SNR, and/or the SINR) measured for the narrow beam pair. In some aspects, in a case in which the first network entity 601 is the victim node that performs the CLI measurement for the narrow beam pair, the first network entity 601 may transmit the indication of the CLI measurement for the narrow beam pair to the coordinator network entity 603.

The coordinator network entity 603 may determine a selected narrow beam pair based at least in part on the CLI measurement for the narrow beam pair. In some aspects, the coordinator network entity 603 may select the narrow beam pair as the selected narrow beam pair in connection with a determination that the CLI measurement for the narrow beam pair (e.g., the CLI measurement between the first narrow beam and the second narrow beam) satisfies a threshold. In some aspects, the coordinator network entity 603 may determine the selected narrow beam from multiple narrow beam pairs for which indications of CLI measurements are received from the first network entity 601 and/or the second network entity 602. In this case, the coordinator network entity 603 may select a narrow beam pair from the multiple narrow beam pairs for which indications of CLI measurements are received based at least in part on the CLI measurements for the multiple narrow beam pairs. For example, the coordinator network entity 603 may select a narrow beam pair with a lowest CLI measurement among the multiple narrow beam pairs, or the coordinator network entity 603 may select a narrow beam pair with a CLI measurement that satisfies a threshold.

The selected narrow beam pair may be a narrow beam pair selected to be used by the first network entity 601 and the second network entity 602 for simultaneous downlink communications (e.g., by one of the first network entity 601 or the second network entity 602) and uplink communications (e.g., by the other one of the first network entity 601 or the second network entity 602). The selected narrow beam pair may include a selected first narrow beam associated with first network entity 601 and a selected second narrow beam associated with the second network entity 602.

As further shown in FIG. 6 and by reference number 650, the coordinator network entity 603 may transmit, to the first network entity 601, and indication of a selected narrow beam for the first network entity 601. The first network entity 601 may receive the indication of the selected narrow beam from the coordinator network entity 603. For example, the coordinator network entity 603 may transmit, to the first network entity 601, an indication of the selected first narrow beam of the selected narrow beam pair.

As shown by reference number 655, the coordinator network entity 603 may transmit, to the second network entity 602, and indication of a selected narrow beam for the second network entity 602. The second network entity 602 may receive the indication of the selected narrow beam from the coordinator network entity 603. For example, the coordinator network entity 603 may transmit, to the second network entity 602, an indication of the selected second narrow beam of the selected narrow beam pair.

As further shown by FIG. 6, and by reference number 660, the first network entity 601 and/or the second network entity 602 may transmit and/or receive communications using the selected narrow beam pair. In some aspects, the first network entity 601 may transmit downlink communications to a UE on the selected first narrow beam simultaneously with the second network entity 602 receiving uplink communications from a UE on the selected second narrow beam. In some aspects, the second network entity 602 may transmit downlink communications to a UE on the selected second narrow beam simultaneously with the first network entity 601 receiving uplink communications from a UE on the selected first narrow beam.

As indicated above, FIG. 6 is provided as an example. Other examples may differ from what is described with respect to FIG. 6.

Figure 7A:
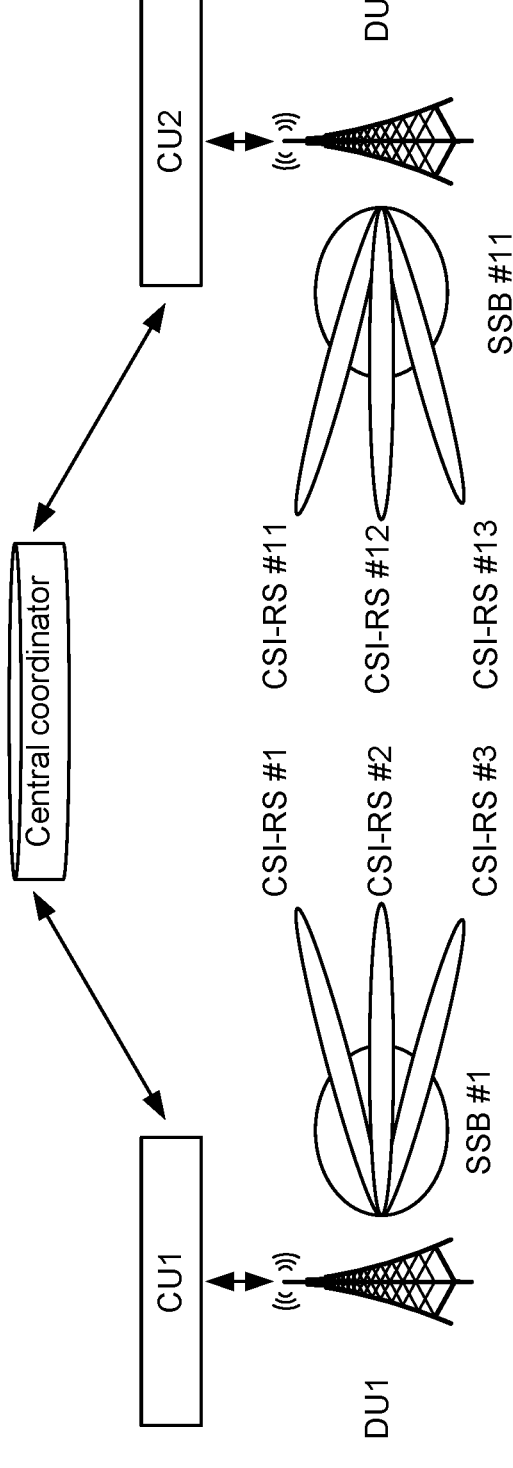
Figure 7B:
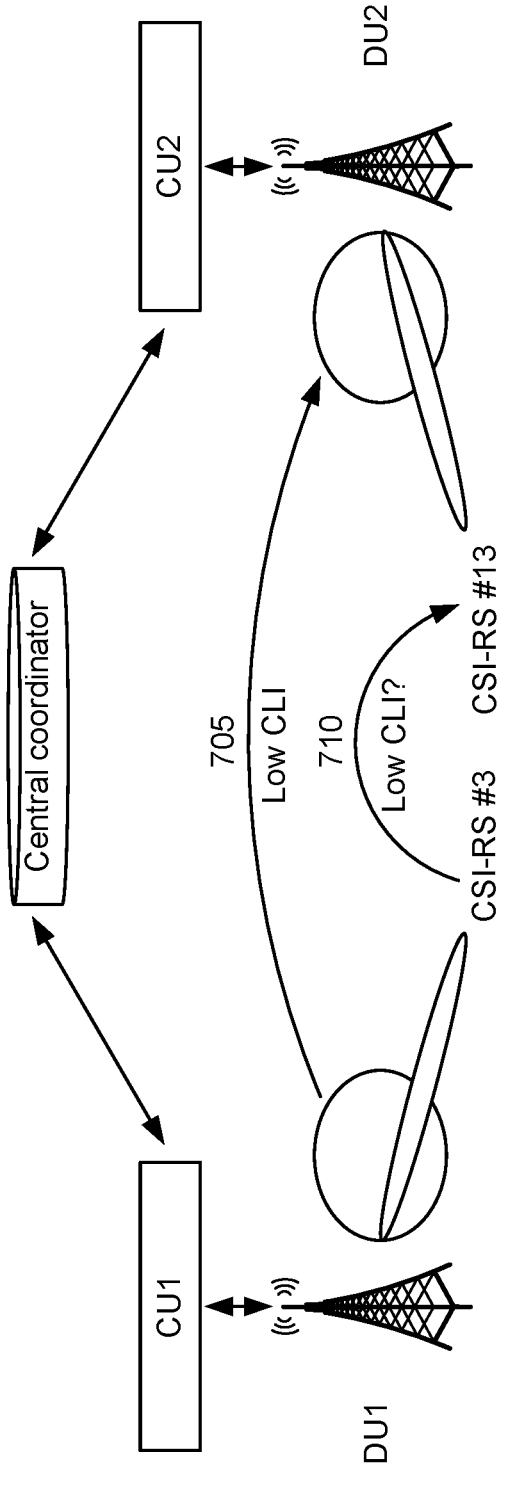

FIGS. 7A and 7B are diagrams illustrating an example 700 associated with beam configuration reporting for hierarchical beam pair identification, in accordance with the present disclosure. As shown in FIGS. 7A and 7B, example 700 includes a first CU (CU1), a first DU (DU1), a second CU (CU2), a second DU (DU2), and a central coordinator device. In example 700, a first network entity may include the CU1, the DU1, or a combination thereof, and a second network entity may include the CU2, the DU2, or a combination thereof. In example 700, the central coordinator device may be a coordinator network entity, such as the coordinator network entity 603 described in connection with FIG. 6. For example, the central coordinator device may be an OAM device or another CU, among other examples.

In some aspects, the first network entity may transmit first beam configuration information associated with the first network entity to the central coordinator, and the second network entity may transmit second beam configuration information associated with the second network entity to the central coordinator. As shown in FIG. 7A, in some aspects, the CU1 may transmit the first beam configuration information associated with the first network entity to the central coordinator, and the CU2 may transmit the second beam configuration information associated with the second network entity to the central coordinator. Alternatively, in some aspects, the DU1 may transmit the first beam configuration information associated with the first network entity to the central coordinator, and the DU2 may transmit the second beam configuration information associated with the second network entity to the central coordinator.

The first beam configuration information may indicate hierarchical beam relations between one or more wide beams (e.g., SSB beams) and a plurality if narrow beams (e.g., CSI-RS beams) associated with the first network entity. As shown in FIG. 7A, for the first network entity, CSI-RS beams corresponding to CSI-RS #1, CSI-RS #2, and CSI-RS #3 may be associated with an SSB beam corresponding to SSB #1. For example, the CSI-RS beams corresponding to CSI-RS #1, CSI-RS #2, and CSI-RS #3 may be narrow beams within the SSB beam corresponding to SSB #1.

The second beam configuration information may indicate hierarchical beam relations between one or more wide beams (e.g., SSB beams) and a plurality if narrow beams (e.g., CSI-RS beams) associated with the second network entity. As shown in FIG. 7A, for the second network entity, CSI-RS beams corresponding to CSI-RS #11, CSI-RS #12, and CSI-RS #13 may be associated with an SSB beam corresponding to SSB #11. For example, the CSI-RS beams corresponding to CSI-RS #11, CSI-RS #12, and CSI-RS #13 may be narrow beams within the SSB beam corresponding to SSB #11.

In some aspects, the central coordinator may identify a compatible narrow beam pair (e.g., for simultaneous downlink transmission by the first network entity and uplink reception by the second network entity) based at least in part on the hierarchical beam relations for the first network entity and the hierarchical beam relations for the second network entity. For example, based at least in part on periodic CLI measurements between wide beams (e.g., SSB beams) associated with the first network entity and wide beams (e.g., SSB beams) associated with the second network entity, the central coordinator may identify one or more compatible wide beam pairs. The central coordinator may then schedule CLI beams measurements for one or more narrow beam pairs that include narrow beams associated with the compatible wide beam pairs. As shown in FIG. 7B and by reference number 705, the central coordinator may determine (e.g., based on a periodic CLI measurement) that a Tx beam (of the first network entity) corresponding to SSB #1 causes low/negligible CLI to an Rx beam (of the second network entity) corresponding to SSB #11 (e.g., the CLI measurement between the Tx beam corresponding to SSB #1 and the Rx beam corresponding to SSB #11 satisfies a threshold). In this case, as shown by reference number 710, the central coordinator may schedule a CLI measurement to be performed for a narrow beam pair including a first narrow beam (e.g., the CSI-RS beam corresponding to CSI-RS #3) within the SSB beam corresponding to SSB #1 and a second narrow beam (e.g., the CSI-RS beam corresponding to CSI-RS #13) within the SSB beam corresponding to SSB #11, in order to verify whether a narrow Tx beam (of the first network entity) corresponding to CSI-RS #3 will also cause low/negligible CLI (e.g., below a threshold) to a narrow Rx beam (of the second network entity) corresponding to CSI-RS #13.

As indicated above, FIGS. 7A and 7B are provided as an example. Other examples may differ from what is described with respect to FIGS. 7A and 7B.

FIG. 8 is a diagram illustrating an example process 800 performed, for example, by a first network entity, in accordance with the present disclosure. Example process 800 is an example where the first network entity (e.g., network entity 601 or 602) performs operations associated with beam configuration reporting for hierarchical beam pair identification.

As shown in FIG. 8, in some aspects, process 800 may include transmitting, to a second network entity, beam configuration information associated with the first network entity, wherein the beam configuration information indicates hierarchical beam relations between one or more wide beams and a plurality of narrow beams (block 810). For example, the first network entity (e.g., using communication manager 1008 and/or transmission component 1004, depicted in FIG. 10) may transmit, to a second network entity, beam configuration information associated with the first network entity, wherein the beam configuration information indicates hierarchical beam relations between one or more wide beams and a plurality of narrow beams, as described above.

As further shown in FIG. 8, in some aspects, process 800 may include receiving, from the second network entity, an indication of a scheduled interference measurement associated with a narrow beam of the plurality of narrow beams based at least in part on the beam configuration information associated with the first network entity (block 820). For example, the first network entity (e.g., using communication manager 1008 and/or reception component 1002, depicted in FIG. 10) may receive, from the second network entity, an indication of a scheduled interference measurement associated with a narrow beam of the plurality of narrow beams based at least in part on the beam configuration information associated with the first network entity, as described above.

Process 800 may include additional aspects, such as any single aspect or any combination of aspects described below and/or in connection with one or more other processes described elsewhere herein.

In a first aspect, the one or more wide beams are one or more first beams having a first beam width, and the plurality of narrow beams is a plurality of second beams having a second beam width that is narrower than the first beam width.

In a second aspect, the beam configuration information indicates an applicable frequency interval for the hierarchical beam relations.

In a third aspect, the applicable frequency interval for the hierarchical beam relations is a CC, a CC group, a frequency band, or a BWP.

In a fourth aspect, the hierarchical beam relations indicate a respective set of narrow beams, of the plurality of narrow beams, associated with each wide beam of the one or more wide beams.

In a fifth aspect, each narrow beam of the plurality of narrow beams corresponds to a respective downlink reference signal, and the beam configuration information indicates the hierarchical beam relations by indicating, for each narrow beam of the plurality of narrow beams, a TCI state for the respective downlink reference signal.

In a sixth aspect, the one or more wide beams include one or more SSB beams, the plurality of narrow beams includes a plurality of CSI-RS beams, and each CSI-RS beam, of the plurality of CSI-RS beams, is associated with an SSB beam of the one or more SSB beams.

In a seventh aspect, the beam configuration information includes, for each CSI-RS beam of the plurality of CSI-RS beams, an indication of a respective TCI state, and, for each CSI-RS beam of the plurality of CSI-RS beams, a QCL source of the respective TCI state indicates the SSB beam, of the one or more SSB beams, associated with that CSI-RS beam.

In an eighth aspect, process 800 includes performing a cross-link interference measurement on the narrow beam of the plurality of narrow beams based at least in part on the indication of the scheduled interference measurement.

In a ninth aspect, process 800 includes transmitting, to the second network entity, an indication of the cross-link interference measurement.

In a tenth aspect, process 800 includes receiving, from the second network entity, an indication of a selected narrow beam to use for receiving uplink communications based at least in part on the indication of the cross-link interference measurement.

In an eleventh aspect, the narrow beam on which the cross-link interference measurement is performed is a receive beam associated with the first network entity, the indication of the scheduled interference measurement indicates a downlink reference signal associated with the first network entity, and the receive beam associated with the first network entity corresponds to a beam used by the first network entity to transmit the downlink reference signal indicated by the indication of the scheduled interference measurement.

In a twelfth aspect, the narrow beam on which the cross-link interference measurement is performed is a first narrow beam associated with the first network entity, and the cross-link interference measurement measures cross-link interference on the first narrow beam from a second narrow beam associated with a third network entity.

In a thirteenth aspect, process 800 includes transmitting, on the narrow beam of the plurality of narrow beams, a reference signal associated with a cross-link interference measurement based at least in part on the indication of the scheduled interference measurement.

In a fourteenth aspect, the first network entity includes a DU.

In a fifteenth aspect, the first network entity includes a CU.

In a sixteenth aspect, the second network entity includes an OAM device.

In a seventeenth aspect, the second network entity includes a CU.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a first network entity, in accordance with the present disclosure. Example process 900 is an example where the first network entity (e.g., coordinator network entity 603) performs operations associated with beam configuration reporting for hierarchical beam pair identification.

As shown in FIG. 9, in some aspects, process 900 may include receiving, from a second network entity, first beam configuration information associated with the second network entity, wherein the first beam configuration information indicates first hierarchical beam relations between one or more first wide beams and a plurality of first narrow beams associated with the second network entity (block 910). For example, the first network entity (e.g., using communication manager 1108 and/or reception component 1102, depicted in FIG. 11) may receive, from a second network entity, first beam configuration information associated with the second network entity, wherein the first beam configuration information indicates first hierarchical beam relations between one or more first wide beams and a plurality of first narrow beams associated with the second network entity, as described above.

As further shown in FIG. 9, in some aspects, process 900 may include receiving, from a third network entity, second beam configuration information associated with the third network entity, wherein the second beam configuration information indicates second hierarchical beam relations between one or more second wide beams and a plurality of second narrow beams associated with the third network entity (block 920). For example, the first network entity (e.g., using communication manager 1108 and/or reception component 1102, depicted in FIG. 11) may receive, from a third network entity, second beam configuration information associated with the third network entity, wherein the second beam configuration information indicates second hierarchical beam relations between one or more second wide beams and a plurality of second narrow beams associated with the third network entity, as described above.

As further shown in FIG. 9, in some aspects, process 900 may include transmitting, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information (block 930). For example, the first network entity (e.g., using communication manager 1108 and/or transmission component 1104, depicted in FIG. 11) may transmit, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information, as described above.

Process 900 may include additional aspects, such as any single aspect or any combination of aspects described below and/or in connection with one or more other processes described elsewhere herein.

In a first aspect, the first beam configuration information indicates that the first narrow beam is associated with a first wide beam of the one or more first wide beams, the second beam configuration information indicates that the second narrow beam is associated with a second wide beam of the one or more second wide beams, and transmitting the indication of the scheduled interference measurement includes transmitting, to the second network entity and the third network entity, the indication of the scheduled interference measurement between the first narrow beam and the second narrow beam based at least in part on an interference measurement between the first wide beam and the second wide beam.

In a second aspect, transmitting the indication of the scheduled interference measurement between the first narrow beam and the second narrow beam based at least in part on the interference measurement between the first wide beam and the second wide beam includes transmitting, to the second network entity and the third network entity, the indication of the scheduled interference measurement between the first narrow beam and the second narrow beam based at least in part on the interference measurement between the first wide beam and the second wide beam satisfying a threshold.

In a third aspect, the first network entity includes an OAM device.

In a fourth aspect, the first network entity includes a CU.

In a fifth aspect, the second network entity includes a first DU and the third network entity includes a second DU.

In a sixth aspect, the second network entity includes a first CU, and the third network entity includes a second CU.

In a seventh aspect, the first beam configuration information indicates a first applicable frequency interval for the first hierarchical beam relations, and the second beam configuration information indicates a second applicable frequency interval for the second hierarchical beam relations.

In an eighth aspect, the first hierarchical beam relations indicate a respective set of first narrow beams, of the plurality of first narrow beams, associated with each first wide beam of the one or more first wide beams, and the second hierarchical beam relations indicate a respective set of second narrow beams, of the plurality of second narrow beams, associated with each second wide beam of the one or more second wide beams.

In a ninth aspect, each first narrow beam of the plurality of first narrow beams corresponds to a respective downlink reference signal associated with the second network entity, and each second narrow beam of the plurality of second narrow beams corresponds to a respective downlink reference signal associated with the third network entity. The first beam configuration information indicates the first hierarchical beam relations by indicating, for each first narrow beam of the plurality of first narrow beams, a TCI state for the respective downlink reference signal associated with the second network entity. The second beam configuration information indicates the second hierarchical beam relations by indicating, for each second narrow beam of the plurality of second narrow beams, a TCI state for the respective downlink reference signal associated with the third network entity.

In a tenth aspect, the one or more first wide beams include one or more first SSB beams associated with the second network entity, the plurality of first narrow beams include a plurality of first CSI-RS beams associated with the second network entity, and each first CSI-RS beam, of the plurality of first CSI-RS beams, is associated with a first SSB beam of the one or more first SSB beams, and the one or more second wide beams include one or more second SSB beams associated with the third network entity, the plurality of second narrow beams include a plurality of second CSI-RS beams associated with the third network entity, and each second CSI-RS beam, of the plurality of second CSI-RS beams, is associated with a second SSB beam of the one or more second SSB beams.

In an eleventh aspect, the first beam configuration information includes, for each first CSI-RS beam of the plurality of first CSI-RS beams, an indication of a respective TCI state, and, for each first CSI-RS beam of the plurality of first CSI-RS beams, a QCL source of the respective TCI state indicates the first SSB beam, of the one or more first SSB beams, associated with that first CSI-RS beam. The second beam configuration information includes, for each second CSI-RS beam of the plurality of second CSI-RS beams, an indication of a respective TCI state, and, for each second CSI-RS beam of the plurality of second CSI-RS beams, a QCL source of the respective TCI state indicates the second SSB beam, of the one or more second SSB beams, associated with that second CSI-RS beam.

In a twelfth aspect, process 900 includes receiving, from the second network entity or the third network entity, an indication of a cross-link interference measurement between the first narrow beam and the second narrow beam based at least in part on indication of the scheduled interference measurement.

In a thirteenth aspect, process 900 includes transmitting, to the second network entity, an indication of a selected first narrow beam based at least in part on the indication of the cross-link interference measurement, and transmitting, to the third network entity, an indication of a selected second narrow beam based at least in part on the indication of the cross-link interference measurement.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
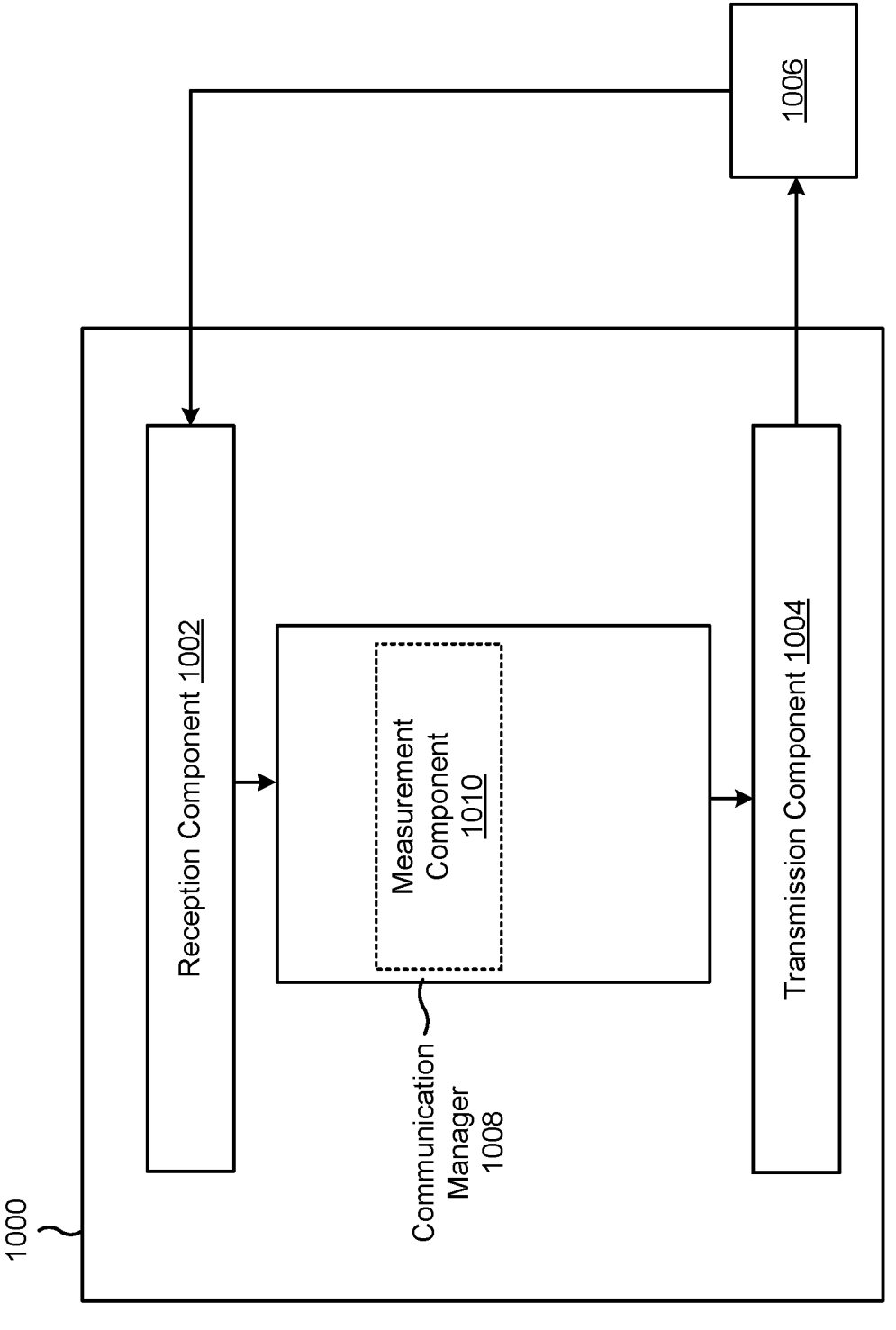
FIGS. 10-11 are diagrams of example apparatuses for wireless communication, in accordance with the present disclosure.

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may include a measurement component 1010, among other examples.

In some aspects, the apparatus 1000 may be configured to perform one or more operations described herein in connection with FIGS. 6, 7A, and 7B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 1008 may control and/or otherwise manage one or more operations of the reception component 1002 and/or the transmission component 1004. The communication manager 1008 may be, or be similar to, the communication manager 150 depicted in FIGS. 1 and 2. For example, in some aspects, the communication manager 1008 may be configured to perform one or more of the functions described as being performed by the communication manager 150. In some aspects, the communication manager 1008 may include the reception component 1002 and/or the transmission component 1004.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit, to a second network entity, beam configuration information, wherein the beam configuration information indicates hierarchical beam relations between one or more wide beams and a plurality of narrow beams. The reception component 1002 may receive, from the second network entity, an indication of a scheduled interference measurement associated with a narrow beam of the plurality of narrow beams based at least in part on the beam configuration information.

The measurement component 1010 may perform a cross-link interference measurement on the narrow beam of the plurality of narrow beams based at least in part on the indication of the scheduled interference measurement.

The transmission component 1004 may transmit, to the second network entity, an indication of the cross-link interference measurement.

The reception component 1002 may receive, from the second network entity, an indication of a selected narrow beam to use for receiving uplink communications based at least in part on the indication of the cross-link interference measurement.

The transmission component 1004 may transmit, on the narrow beam of the plurality of narrow beams, a reference signal associated with a cross-link interference measurement based at least in part on the indication of the scheduled interference measurement.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
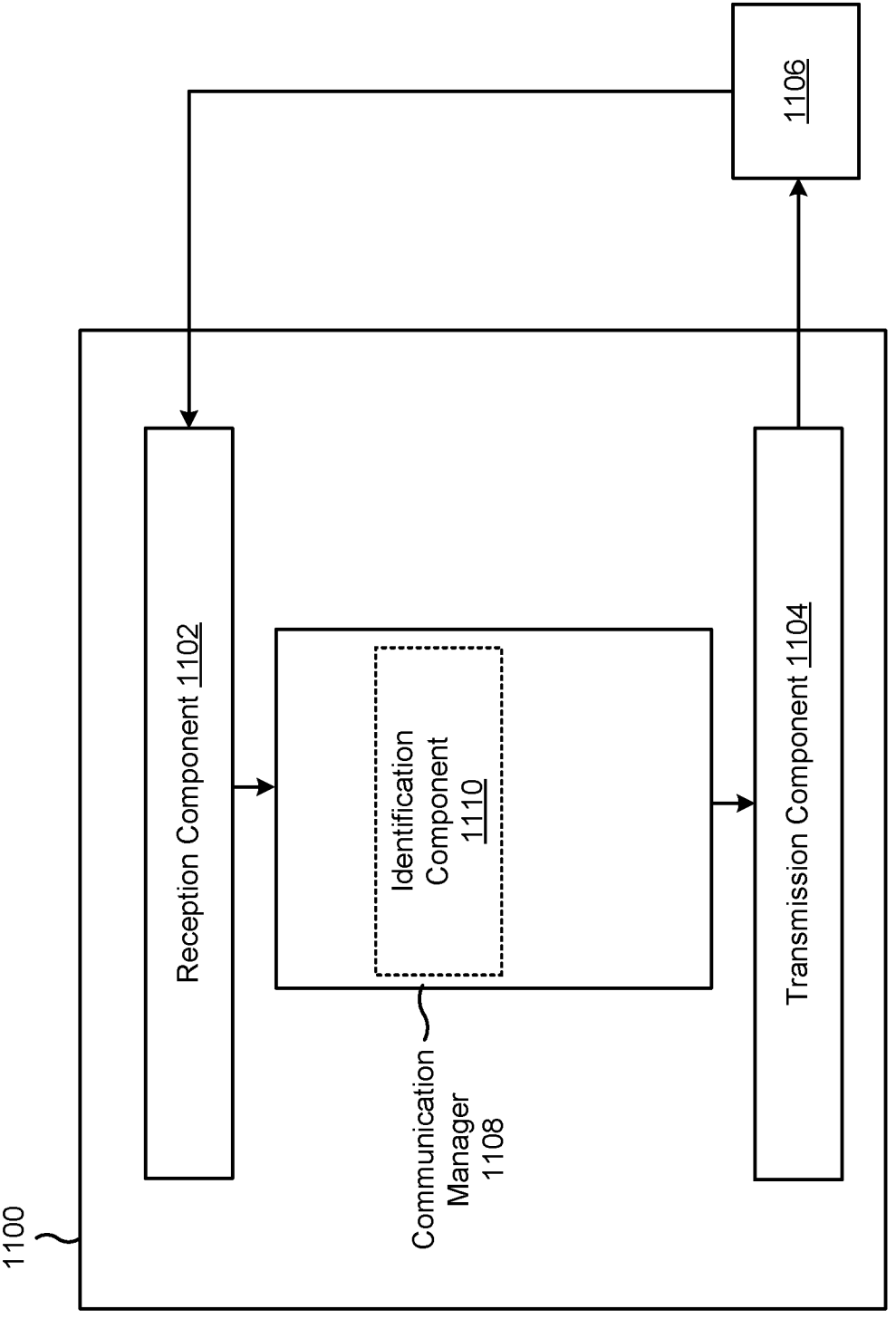

FIG. 11 is a diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may include an identification component 1110, among other examples.

In some aspects, the apparatus 1100 may be configured to perform one or more operations described herein in connection with FIGS. 6, 7A, and 7B. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network entity described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 1108 may control and/or otherwise manage one or more operations of the reception component 1102 and/or the transmission component 1104. In some aspects, communication manager 1108 may be, or be similar to, the communication manager 150 depicted in FIGS. 1 and 2. For example, in some aspects, the communication manager 1108 may be configured to perform one or more of the functions described as being performed by the communication manager 150. In some aspects, communication manager 1108 may be, or be similar to, the communication manager 160 depicted in FIG. 1. For example, in some aspects, the communication manager 1108 may be configured to perform one or more of the functions described as being performed by the communication manager 160. In some aspects, the communication manager 1108 may include the reception component 1102 and/or the transmission component 1104.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network entity described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network entity described in connection with FIG. 2. In some aspects, the transmission component 1104 may be co-located with the reception component 1102 in a transceiver.

The reception component 1102 may receive, from a second network entity, first beam configuration information associated with the second network entity, wherein the first beam configuration information indicates first hierarchical beam relations between one or more first wide beams and a plurality of first narrow beams associated with the second network entity. The reception component 1102 may receive, from a third network entity, second beam configuration information associated with the third network entity, wherein the second beam configuration information indicates second hierarchical beam relations between one or more second wide beams and a plurality of second narrow beams associated with the third network entity. The transmission component 1104 may transmit, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information.

The reception component 1102 may receive, from the second network entity or the third network entity, an indication of a cross-link interference measurement between the first narrow beam and the second narrow beam based at least in part on indication of the scheduled interference measurement.

The transmission component 1104 may transmit, to the second network entity, an indication of a selected first narrow beam based at least in part on the indication of the cross-link interference measurement.

The transmission component 1104 may transmit, to the third network entity, an indication of a selected second narrow beam based at least in part on the indication of the cross-link interference measurement.

The identification component 1110 may identify the first narrow beam and the second narrow beam, and/or the identification component 1110 may identify the selected first narrow beam and the selected second narrow beam.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first network entity, comprising: transmitting, to a second network entity, beam configuration information associated with the first network entity, wherein the beam configuration information indicates hierarchical beam relations between one or more wide beams and a plurality of narrow beams; and receiving, from the second network entity, an indication of a scheduled interference measurement associated with a narrow beam of the plurality of narrow beams based at least in part on the beam configuration information associated with the first network entity.

Aspect 2: The method of Aspect 1, wherein the one or more wide beams are one or more first beams having a first beam width, and the plurality of narrow beams is a plurality of second beams having a second beam width that is narrower than the first beam width.

Aspect 3: The method of any of Aspects 1-2, wherein the beam configuration information indicates an applicable frequency interval for the hierarchical beam relations.

Aspect 4: The method of Aspect 3, wherein the applicable frequency interval for the hierarchical beam relations is a component carrier (CC), a CC group, a frequency band, or a bandwidth part (BWP).

Aspect 5: The method of any of Aspects 1-4, wherein the hierarchical beam relations indicate a respective set of narrow beams, of the plurality of narrow beams, associated with each wide beam of the one or more wide beams.

Aspect 6: The method of any of Aspects 1-5, wherein each narrow beam of the plurality of narrow beams corresponds to a respective downlink reference signal, and wherein the beam configuration information indicates the hierarchical beam relations by indicating, for each narrow beam of the plurality of narrow beams, a transmission configuration indicator (TCI) state for the respective downlink reference signal.

Aspect 7: The method of any of Aspects 1-6, wherein the one or more wide beams include one or more synchronization signal block (SSB) beams, wherein the plurality of narrow beams includes a plurality of channel state information reference signal (CSI-RS) beams, and wherein each CSI-RS beam, of the plurality of CSI-RS beams, is associated with an SSB beam of the one or more SSB beams.

Aspect 8: The method of Aspect 7, wherein the beam configuration information includes, for each CSI-RS beam of the plurality of CSI-RS beams, an indication of a respective TCI state, and wherein, for each CSI-RS beam of the plurality of CSI-RS beams, a quasi co-location (QCL) source of the respective TCI state indicates the SSB beam, of the one or more SSB beams, associated with that CSI-RS beam.

Aspect 9: The method of any of Aspects 1-8, further comprising: performing a cross-link interference measurement on the narrow beam of the plurality of narrow beams based at least in part on the indication of the scheduled interference measurement.

Aspect 10: The method of Aspect 9, further comprising: transmitting, to the second network entity, an indication of the cross-link interference measurement.

Aspect 11: The method of Aspect 10, further comprising: receiving, from the second network entity, an indication of a selected narrow beam to use for receiving uplink communications based at least in part on the indication of the cross-link interference measurement.

Aspect 12: The method of any of Aspects 9-11, wherein the narrow beam on which the cross-link interference measurement is performed is a receive beam associated with the first network entity, wherein the indication of the scheduled interference measurement indicates a downlink reference signal associated with the first network entity, and wherein the receive beam associated with the first network entity corresponds to a beam used by the first network entity to transmit the downlink reference signal indicated by the indication of the scheduled interference measurement.

Aspect 13: The method of any of Aspects 9-12, wherein the narrow beam on which the cross-link interference measurement is performed is a first narrow beam associated with the first network entity, and wherein the cross-link interference measurement measures cross-link interference on the first narrow beam from a second narrow beam associated with a third network entity.

Aspect 14: The method of any of Aspects 1-8, further comprising: transmitting, on the narrow beam of the plurality of narrow beams, a reference signal associated with a cross-link interference measurement based at least in part on the indication of the scheduled interference measurement.

Aspect 15: The method of any of Aspects 1-14, wherein the first network entity includes a distributed unit (DU).

Aspect 16: The method of any of Aspects 1-15, wherein the first network entity includes a central unit (CU).

Aspect 17: The method of any of Aspects 1-16, wherein the second network entity includes an operations, administration, and management (OAM) device.

Aspect 18: The method of any of Aspects 1-16, wherein the second network entity includes a central unit (CU).

Aspect 19: A method of wireless communication performed by a first network entity, comprising: receiving, from a second network entity, first beam configuration information associated with the second network entity, wherein the first beam configuration information indicates first hierarchical beam relations between one or more first wide beams and a plurality of first narrow beams associated with the second network entity; receiving, from a third network entity, second beam configuration information associated with the third network entity, wherein the second beam configuration information indicates second hierarchical beam relations between one or more second wide beams and a plurality of second narrow beams associated with the third network entity; and transmitting, to the second network entity and the third network entity, an indication of a scheduled interference measurement between a first narrow beam, of the plurality of first narrow beams, and a second narrow beam, of the plurality of second narrow beams, based at least in part on the first beam configuration information and the second beam configuration information.

Aspect 20: The method of Aspect 19, wherein the first beam configuration information indicates that the first narrow beam is associated with a first wide beam of the one or more first wide beams, wherein the second beam configuration information indicates that the second narrow beam is associated with a second wide beam of the one or more second wide beams, and wherein transmitting the indication of the scheduled interference measurement comprises: transmitting, to the second network entity and the third network entity, the indication of the scheduled interference measurement between the first narrow beam and the second narrow beam based at least in part on an interference measurement between the first wide beam and the second wide beam.

Aspect 21: The method of Aspect 20, wherein transmitting the indication of the scheduled interference measurement between the first narrow beam and the second narrow beam based at least in part on the interference measurement between the first wide beam and the second wide beam comprises: transmitting, to the second network entity and the third network entity, the indication of the scheduled interference measurement between the first narrow beam and the second narrow beam based at least in part on the interference measurement between the first wide beam and the second wide beam satisfying a threshold.

Aspect 22: The method of any of Aspects 19-21, wherein the first network entity includes an operations, administration, and management (OAM) device.

Aspect 23: The method of any of Aspects 19-21, wherein the first network entity includes a central unit (CU).

Aspect 24: The method of any of Aspects 19-23, wherein the second network entity includes a first distributed unit (DU) and the third network entity includes a second DU.

Aspect 25: The method of any of Aspects 19-24, wherein the second network entity includes a first central unit (CU) and the third network entity includes a second central unit (CU).

Aspect 26: The method of any of Aspects 19-25, wherein the first beam configuration information indicates a first applicable frequency interval for the first hierarchical beam relations, and wherein the second beam configuration information indicates a second applicable frequency interval for the second hierarchical beam relations.

Aspect 27: The method of any of Aspects 19-26, wherein the first hierarchical beam relations indicate a respective set of first narrow beams, of the plurality of first narrow beams, associated with each first wide beam of the one or more first wide beams, and wherein the second hierarchical beam relations indicate a respective set of second narrow beams, of the plurality of second narrow beams, associated with each second wide beam of the one or more second wide beams.

Aspect 28: The method of any of Aspects 19-27, wherein each first narrow beam of the plurality of first narrow beams corresponds to a respective downlink reference signal associated with the second network entity, wherein each second narrow beam of the plurality of second narrow beams corresponds to a respective downlink reference signal associated with the third network entity, wherein the first beam configuration information indicates the first hierarchical beam relations by indicating, for each first narrow beam of the plurality of first narrow beams, a transmission configuration indicator (TCI) state for the respective downlink reference signal associated with the second network entity, and wherein the second beam configuration information indicates the second hierarchical beam relations by indicating, for each second narrow beam of the plurality of second narrow beams, a TCI state for the respective downlink reference signal associated with the third network entity.

Aspect 29: The method of any of Aspects 19-28, wherein the one or more first wide beams include one or more first synchronization signal block (SSB) beams associated with the second network entity, the plurality of first narrow beams include a plurality of first channel state information reference signal (CSI-RS) beams associated with the second network entity, and each first CSI-RS beam, of the plurality of first CSI-RS beams, is associated with a first SSB beam of the one or more first SSB beams, and wherein the one or more second wide beams include one or more second SSB beams associated with the third network entity, the plurality of second narrow beams include a plurality of second CSI-RS beams associated with the third network entity, and each second CSI-RS beam, of the plurality of second CSI-RS beams, is associated with a second SSB beam of the one or more second SSB beams.

Aspect 30: The method of Aspect 29, wherein the first beam configuration information includes, for each first CSI-RS beam of the plurality of first CSI-RS beams, an indication of a respective TCI state, wherein, for each first CSI-RS beam of the plurality of first CSI-RS beams, a quasi co-location (QCL) source of the respective TCI state indicates the first SSB beam, of the one or more first SSB beams, associated with that first CSI-RS beam, wherein the second beam configuration information includes, for each second CSI-RS beam of the plurality of second CSI-RS beams, an indication of a respective TCI state, and wherein, for each second CSI-RS beam of the plurality of second CSI-RS beams, a QCL source of the respective TCI state indicates the second SSB beam, of the one or more second SSB beams, associated with that second CSI-RS beam.

Aspect 31: The method of any of Aspects 19-30, further comprising: receiving, from the second network entity or the third network entity, an indication of a cross-link interference measurement between the first narrow beam and the second narrow beam based at least in part on indication of the scheduled interference measurement.

Aspect 32: The method of Aspect 31, further comprising: transmitting, to the second network entity, an indication of a selected first narrow beam based at least in part on the indication of the cross-link interference measurement; and transmitting, to the third network entity, an indication of a selected second narrow beam based at least in part on the indication of the cross-link interference measurement.

Aspect 33: An apparatus for wireless communication at a device, comprising a processor; memory coupled with the processor; and instructions stored in the memory and executable by the processor to cause the apparatus to perform the method of one or more of Aspects 1-18.

Aspect 34: A device for wireless communication, comprising a memory and one or more processors coupled to the memory, the one or more processors configured to perform the method of one or more of Aspects 1-18.

Aspect 35: An apparatus for wireless communication, comprising at least one means for performing the method of one or more of Aspects 1-18.

Aspect 36: A non-transitory computer-readable medium storing code for wireless communication, the code comprising instructions executable by a processor to perform the method of one or more of Aspects 1-18.

Aspect 37: A non-transitory computer-readable medium storing a set of instructions for wireless communication, the set of instructions comprising one or more instructions that, when executed by one or more processors of a device, cause the device to perform the method of one or more of Aspects 1-18.

Aspect 38: An apparatus for wireless communication at a device, comprising a processor; memory coupled with the processor; and instructions stored in the memory and executable by the processor to cause the apparatus to perform the method of one or more of Aspects 19-32.

Aspect 39: A device for wireless communication, comprising a memory and one or more processors coupled to the memory, the one or more processors configured to perform the method of one or more of Aspects 19-32.

Aspect 40: An apparatus for wireless communication, comprising at least one means for performing the method of one or more of Aspects 19-32.

Aspect 41: A non-transitory computer-readable medium storing code for wireless communication, the code comprising instructions executable by a processor to perform the method of one or more of Aspects 19-32.

Aspect 42: A non-transitory computer-readable medium storing a set of instructions for wireless communication, the set of instructions comprising one or more instructions that, when executed by one or more processors of a device, cause the device to perform the method of one or more of Aspects 19-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network entity for wireless communication, comprising:

one or more memories; and one or more processors, coupled to the one or more memories, configured to:

transmit, to a second network entity, beam configuration information associated with the first network entity, wherein the beam configuration information indicates hierarchical beam relations between one or more wide beams and a plurality of narrow beams;

receive, from the second network entity, an indication of a scheduled cross-link interference measurement associated with a narrow beam of the plurality of narrow beams based at least in part on the beam configuration information associated with the first network entity; and perform a cross-link interference measurement on the narrow beam of the plurality of narrow beams based at least in part on the indication of the scheduled cross-link interference measurement.

2. The first network entity of claim 1, wherein the one or more wide beams are one or more first beams having a first beam width, and the plurality of narrow beams is a plurality of second beams having a second beam width that is narrower than the first beam width.

3. The first network entity of claim 1, wherein the beam configuration information indicates an applicable frequency interval for the hierarchical beam relations.

4. The first network entity of claim 3, wherein the applicable frequency interval for the hierarchical beam relations is a component carrier (CC), a CC group, a frequency band, or a bandwidth part (BWP).

5. The first network entity of claim 1, wherein the hierarchical beam relations indicate a respective set of narrow beams, of the plurality of narrow beams, associated with each wide beam of the one or more wide beams.

6. The first network entity of claim 1, wherein each narrow beam of the plurality of narrow beams corresponds to a respective downlink reference signal, and wherein the beam configuration information indicates the hierarchical beam relations by indicating, for each narrow beam of the plurality of narrow beams, a transmission configuration indicator (TCI) state for the respective downlink reference signal.

7. The first network entity of claim 1, wherein the one or more wide beams include one or more synchronization signal block (SSB) beams, wherein the plurality of narrow beams includes a plurality of channel state information reference signal (CSI-RS) beams, and wherein each CSI-RS beam, of the plurality of CSI-RS beams, is associated with an SSB beam of the one or more SSB beams.

8. The first network entity of claim 7, wherein the beam configuration information includes, for each CSI-RS beam of the plurality of CSI-RS beams, an indication of a respective TCI state, and wherein, for each CSI-RS beam of the plurality of CSI-RS beams, a quasi co-location (QCL) source of the respective TCI state indicates the SSB beam, of the one or more SSB beams, associated with that CSI-RS beam.

9. The first network entity of claim 1, wherein the one or more processors are further configured to:

transmit, to the second network entity, an indication of the cross-link interference measurement.

10. The first network entity of claim 9, wherein the one or more processors are further configured to:

receive, from the second network entity, an indication of a selected narrow beam to use for receiving uplink communications based at least in part on the indication of the cross-link interference measurement.

11. The first network entity of claim 1, wherein the narrow beam on which the cross-link interference measurement is performed is a receive beam associated with the first network entity, wherein the indication of the scheduled cross-link interference measurement indicates a downlink reference signal associated with the first network entity, and wherein the receive beam associated with the first network entity corresponds to a beam used by the first network entity to transmit the downlink reference signal indicated by the indication of the scheduled cross-link interference measurement.

12. The first network entity of claim 1, wherein the narrow beam on which the cross-link interference measurement is performed is a first narrow beam associated with the first network entity, and wherein the cross-link interference measurement measures cross-link interference on the first narrow beam from a second narrow beam associated with a third network entity.

13. The first network entity of claim 1, wherein the one or more processors are further configured to:

transmit, on the narrow beam of the plurality of narrow beams, a reference signal associated with a cross-link interference measurement based at least in part on the indication of the scheduled cross-link interference measurement.

14. The first network entity of claim 1, wherein the first network entity includes a distributed unit (DU).

15. The first network entity of claim 1, wherein the second network entity includes an operations, administration, and management (OAM) device.

16. The first network entity of claim 1, wherein the second network entity includes a central unit (CU).

17. A first network entity for wireless communication, comprising:

one or more memories; and one or more processors, coupled to the one or more memories, configured to:

receive, from a second network entity, first beam configuration information associated with the second network entity, wherein the first beam configuration information indicates first hierarchical beam relations between one or more first wide beams and a plurality of first narrow beams associated with the second network entity;

receive, from a third network entity, second beam configuration information associated with the third network entity, wherein the second beam configuration information indicates second hierarchical beam relations between one or more second wide beams and a plurality of second narrow beams associated with the third network entity; and transmit, to the second network entity and the third network entity, an indication of a scheduled cross-link interference measurement between a first narrow beam, of the plurality of first narrow beams, and a second narrow beam, of the plurality of second narrow beams, based at least in part on the first beam configuration information and the second beam configuration information.

18. The first network entity of claim 17, wherein the first beam configuration information indicates that the first narrow beam is associated with a first wide beam of the one or more first wide beams, wherein the second beam configuration information indicates that the second narrow beam is associated with a second wide beam of the one or more second wide beams, and wherein the one or more processors, to transmit the indication of the scheduled cross-link interference measurement, are configured to:

transmit, to the second network entity and the third network entity, the indication of the scheduled cross-link interference measurement between the first narrow beam and the second narrow beam based at least in part on an interference measurement between the first wide beam and the second wide beam.

19. The first network entity of claim 18, wherein the one or more processors, to transmit the indication of the scheduled cross-link interference measurement between the first narrow beam and the second narrow beam based at least in part on the interference measurement between the first wide beam and the second wide beam, are configured to:

transmit, to the second network entity and the third network entity, the indication of the scheduled cross-link interference measurement between the first narrow beam and the second narrow beam based at least in part on the interference measurement between the first wide beam and the second wide beam satisfying a threshold.

20. The first network entity of claim 17, wherein the first network entity includes an operations, administration, and management (OAM) device.

21. The first network entity of claim 17, wherein the first network entity includes a central unit (CU).

22. A method of wireless communication performed by a first network entity, comprising:

transmitting, to a second network entity, beam configuration information associated with the first network entity, wherein the beam configuration information indicates hierarchical beam relations between one or more wide beams and a plurality of narrow beams;

receiving, from the second network entity, an indication of a scheduled cross-link interference measurement associated with a narrow beam of the plurality of narrow beams based at least in part on the beam configuration information associated with the first network entity; and performing a cross-link interference measurement on the narrow beam of the plurality of narrow beams based at least in part on the indication of the scheduled cross-link interference measurement.

23. The method of claim 22, wherein the beam configuration information indicates an applicable frequency interval for the hierarchical beam relations.

24. The method of claim 22, wherein the hierarchical beam relations indicate a respective set of narrow beams, of the plurality of narrow beams, associated with each wide beam of the one or more wide beams, and wherein each narrow beam of the plurality of narrow beams corresponds to a respective downlink reference signal, and wherein the beam configuration information indicates the hierarchical beam relations by indicating, for each narrow beam of the plurality of narrow beams, a transmission configuration indicator (TCI) state for the respective downlink reference signal.

25. The method of claim 22, wherein the one or more wide beams include one or more synchronization signal block (SSB) beams, wherein the plurality of narrow beams includes a plurality of channel state information reference signal (CSI-RS) beams, and wherein each CSI-RS beam, of the plurality of CSI-RS beams, is associated with an SSB beam of the one or more SSB beams.

26. The method of claim 22, further comprising:

transmitting, to the second network entity, an indication of the cross-link interference measurement.

27. The method of claim 22, wherein an applicable frequency interval for the hierarchical beam relations is a component carrier (CC), a CC group, a frequency band, or a bandwidth part (BWP).

28. A method of wireless communication performed by a first network entity, comprising:

receiving, from a second network entity, first beam configuration information associated with the second network entity, wherein the first beam configuration information indicates first hierarchical beam relations between one or more first wide beams and a plurality of first narrow beams associated with the second network entity;

receiving, from a third network entity, second beam configuration information associated with the third network entity, wherein the second beam configuration information indicates second hierarchical beam relations between one or more second wide beams and a plurality of second narrow beams associated with the third network entity; and transmitting, to the second network entity and the third network entity, an indication of a scheduled cross-link interference measurement between a first narrow beam, of the plurality of first narrow beams, and a second narrow beam, of the plurality of second narrow beams, based at least in part on the first beam configuration information and the second beam configuration information.

29. The method of claim 28, wherein the first beam configuration information indicates that the first narrow beam is associated with a first wide beam of the one or more first wide beams, wherein the second beam configuration information indicates that the second narrow beam is associated with a second wide beam of the one or more second wide beams, and wherein transmitting the indication of the scheduled cross-link interference measurement comprises:

transmitting, to the second network entity and the third network entity, the indication of the scheduled cross-link interference measurement between the first narrow beam and the second narrow beam based at least in part on an interference measurement between the first wide beam and the second wide beam.

30. The method of claim 29, wherein transmitting the indication of the scheduled cross-link interference measurement between the first narrow beam and the second narrow beam based at least in part on the interference measurement between the first wide beam and the second wide beam comprises:

transmitting, to the second network entity and the third network entity, the indication of the scheduled cross-link interference measurement between the first narrow beam and the second narrow beam based at least in part on the interference measurement between the first wide beam and the second wide beam satisfying a threshold.

* * * * *